United States Patent
Wredenhagen et al.

(10) Patent No.: US 7,129,990 B2
(45) Date of Patent: Oct. 31, 2006

(54) SYSTEM AND METHOD FOR DETECTING A NON-VIDEO SOURCE IN VIDEO SIGNALS

(75) Inventors: G. Finn Wredenhagen, Toronto (CA); Gary Cheng, Scarborough (CA); Kevin Ng, Unionville (CA)

(73) Assignee: Jaldi Semiconductor Corp., Richmond Hill (CA)

( * ) Notice: Subject to any disclaimer, the term of this patent is extended or adjusted under 35 U.S.C. 154(b) by 491 days.

(21) Appl. No.: 10/024,479

(22) Filed: Dec. 21, 2001

(65) Prior Publication Data

US 2002/0135697 A1    Sep. 26, 2002

(30) Foreign Application Priority Data

Jan. 11, 2001    (CA) .................................... 2330854

(51) Int. Cl.
  H04N 11/20    (2006.01)
  H04N 7/01    (2006.01)
  H04N 5/14    (2006.01)
  H04N 5/46    (2006.01)
  H04N 9/64    (2006.01)

(52) U.S. Cl. .................... 348/449; 348/452; 348/468; 348/473; 348/558; 348/700

(58) Field of Classification Search ................ 348/441, 348/448, 452, 459, 468, 473, 553, 558, 700, 348/701; H04N 11/20, 7/01, 5/14, 9/64, H04N 5/46

See application file for complete search history.

(56) References Cited

U.S. PATENT DOCUMENTS

| | | | |
|---|---|---|---|
| 4,876,596 A | 10/1989 | Faroudja | |
| 4,982,280 A | 1/1991 | Lyon et al. | |
| 4,998,287 A | 3/1991 | Katznelson et al. | |
| 5,317,398 A * | 5/1994 | Casavant et al. | 348/570 |
| 5,337,154 A | 8/1994 | Dorricott et al. | |
| 5,446,497 A | 8/1995 | Keating et al. | |
| 5,563,651 A | 10/1996 | Christopher et al. | |
| 5,689,301 A | 11/1997 | Christopher et al. | |
| 5,734,420 A * | 3/1998 | Lee et al. | 348/97 |
| 5,742,352 A | 4/1998 | Tsukagoshi | |
| 5,748,251 A | 5/1998 | Nishimura | |
| 5,748,256 A * | 5/1998 | Tsukagoshi | 348/589 |
| 5,757,435 A * | 5/1998 | Wells | 348/441 |
| 5,815,215 A | 9/1998 | Yang | |
| 5,828,786 A * | 10/1998 | Rao et al. | 282/236 |
| 5,844,618 A * | 12/1998 | Horiike et al. | 348/441 |
| 5,870,151 A * | 2/1999 | Korber | 348/553 |
| 5,937,090 A | 8/1999 | Kim | |
| 5,959,681 A | 9/1999 | Cho | |

(Continued)

Primary Examiner—Brian P. Yenke
(74) Attorney, Agent, or Firm—Marger Johnson & McCollom P.C.

(57) ABSTRACT

A system detects a non-video source embedded in a video sequence and provides direction to a deinterlacing algorithm accordingly. The system comprises a signal generator for generating a plurality of signals. The signals are generated in accordance with pixels input from the video sequence. The system further comprises a plurality of pattern detection state machines, each for receiving the signals and for detecting a pattern in the video sequence. The pattern is detected in accordance with a preset threshold, wherein the pattern detection state machine varies the preset threshold in accordance with the received signals. The system further comprises an arbiter state machine coupled with the plurality of pattern detection state machines for governing the pattern detection state machines and for determining whether or not a non-video source is embedded in the video sequence.

28 Claims, 17 Drawing Sheets

U.S. PATENT DOCUMENTS

| | | |
|---|---|---|
| 6,002,386 A | 12/1999 | Gu |
| 6,002,797 A * | 12/1999 | Mori et al. .................. 382/173 |
| 6,014,182 A | 1/2000 | Swartz |
| 6,018,588 A | 1/2000 | Kim |
| 6,049,626 A | 4/2000 | Kim |
| 6,101,274 A | 8/2000 | Pizano et al. |
| 6,108,041 A * | 8/2000 | Faroudja et al. ............ 348/446 |
| 6,185,329 B1 * | 2/2001 | Zhang et al. ............... 382/176 |
| 6,204,883 B1 * | 3/2001 | Tsukagoshi ................. 348/468 |
| 6,208,385 B1 * | 3/2001 | Konishi et al. ............. 348/558 |
| 6,226,041 B1 * | 5/2001 | Florencio et al. ........... 348/473 |
| 6,226,046 B1 * | 5/2001 | Yamagata et al. .......... 348/558 |
| 6,262,773 B1 * | 7/2001 | Westerman ................. 348/448 |
| 6,366,699 B1 * | 4/2002 | Kuwano et al. ............ 382/199 |
| 6,366,706 B1 * | 4/2002 | Weitbruch .................. 382/254 |
| 6,449,015 B1 * | 9/2002 | Sugaya ....................... 348/459 |
| 6,459,455 B1 * | 10/2002 | Jiang et al. ................. 348/452 |
| 6,563,550 B1 * | 5/2003 | Kahn et al. ................. 348/700 |
| 6,608,930 B1 * | 8/2003 | Agnihotri et al. ........... 382/176 |
| 6,621,927 B1 * | 9/2003 | Mori et al. ................. 382/173 |
| 6,724,433 B1 * | 4/2004 | Lippman .................... 348/558 |
| 6,757,022 B1 * | 6/2004 | Wredenhagen et al. ..... 348/452 |
| 6,829,013 B1 * | 12/2004 | Thompson et al. ......... 348/448 |
| 6,839,094 B1 * | 1/2005 | Tang et al. ................. 348/607 |
| 6,842,194 B1 * | 1/2005 | Sugihara .................... 348/441 |
| 6,859,237 B1 * | 2/2005 | Swartz ....................... 348/700 |
| 6,862,368 B1 * | 3/2005 | He et al. .................... 382/199 |
| 6,867,814 B1 * | 3/2005 | Adams et al. .............. 348/448 |
| 6,897,903 B1 * | 5/2005 | Hu ............................ 348/700 |
| 6,898,243 B1 * | 5/2005 | Alvarez .................... 375/240.14 |
| 6,909,466 B1 * | 6/2005 | Scheffler et al. ............ 348/459 |
| 6,909,469 B1 * | 6/2005 | Adams ....................... 348/700 |
| 6,928,191 B1 * | 8/2005 | Goertzen .................... 382/240 |
| 6,970,206 B1 * | 11/2005 | Swan et al. ................. 348/448 |
| 2001/0002853 A1 * | 6/2001 | Lim .......................... 348/558 |
| 2002/0054236 A1 * | 5/2002 | Wredenhagen et al. ..... 348/452 |
| 2002/0057368 A1 * | 5/2002 | Fakhruddin ................. 348/558 |
| 2002/0149703 A1 * | 10/2002 | Adams et al. .............. 348/700 |
| 2003/0098924 A1 * | 5/2003 | Adams et al. .............. 348/448 |
| 2005/0099538 A1 * | 5/2005 | Wredenhagen et al. ..... 348/452 |

* cited by examiner

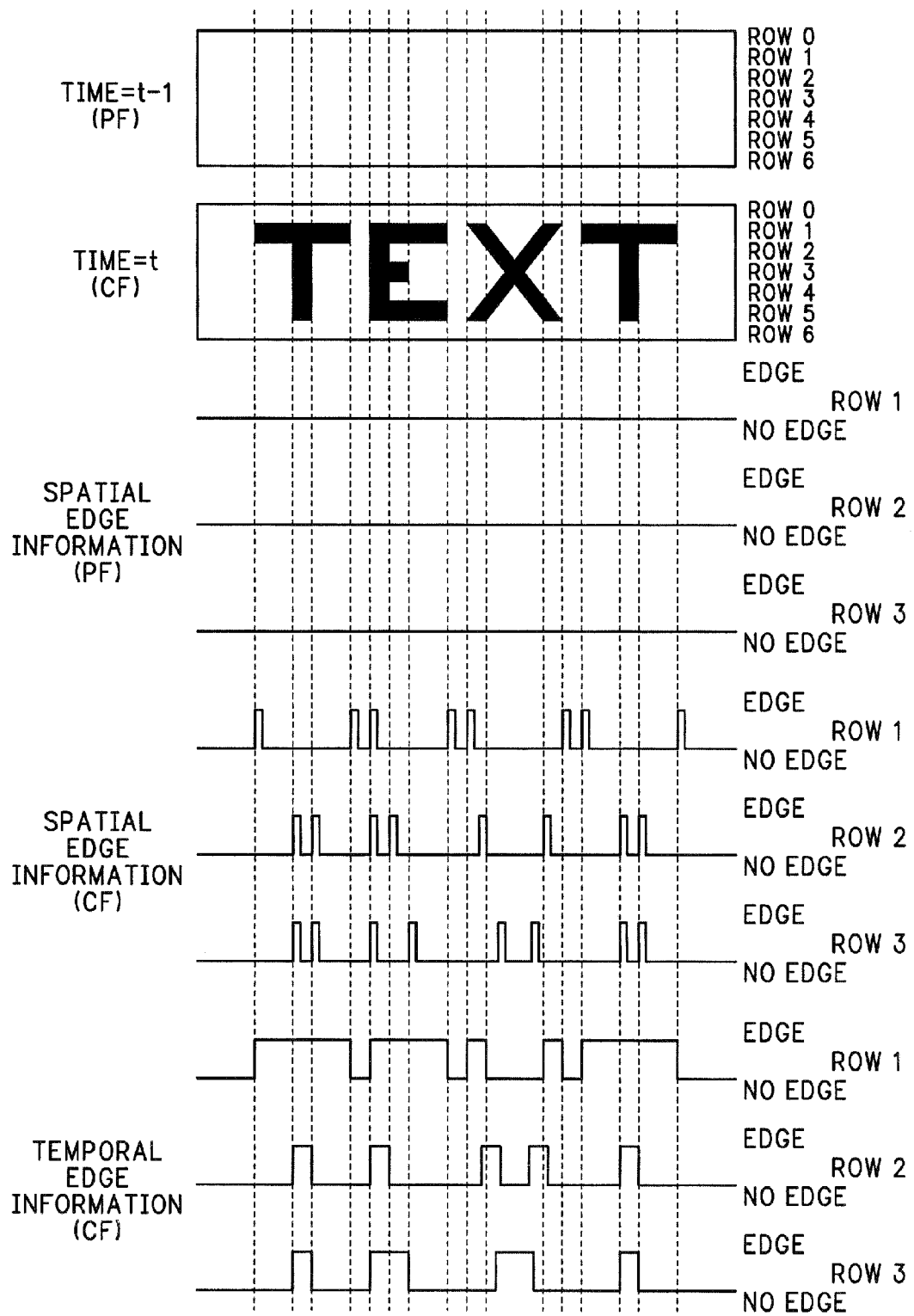
Figure 22 SUBTITLES ON ENTRY

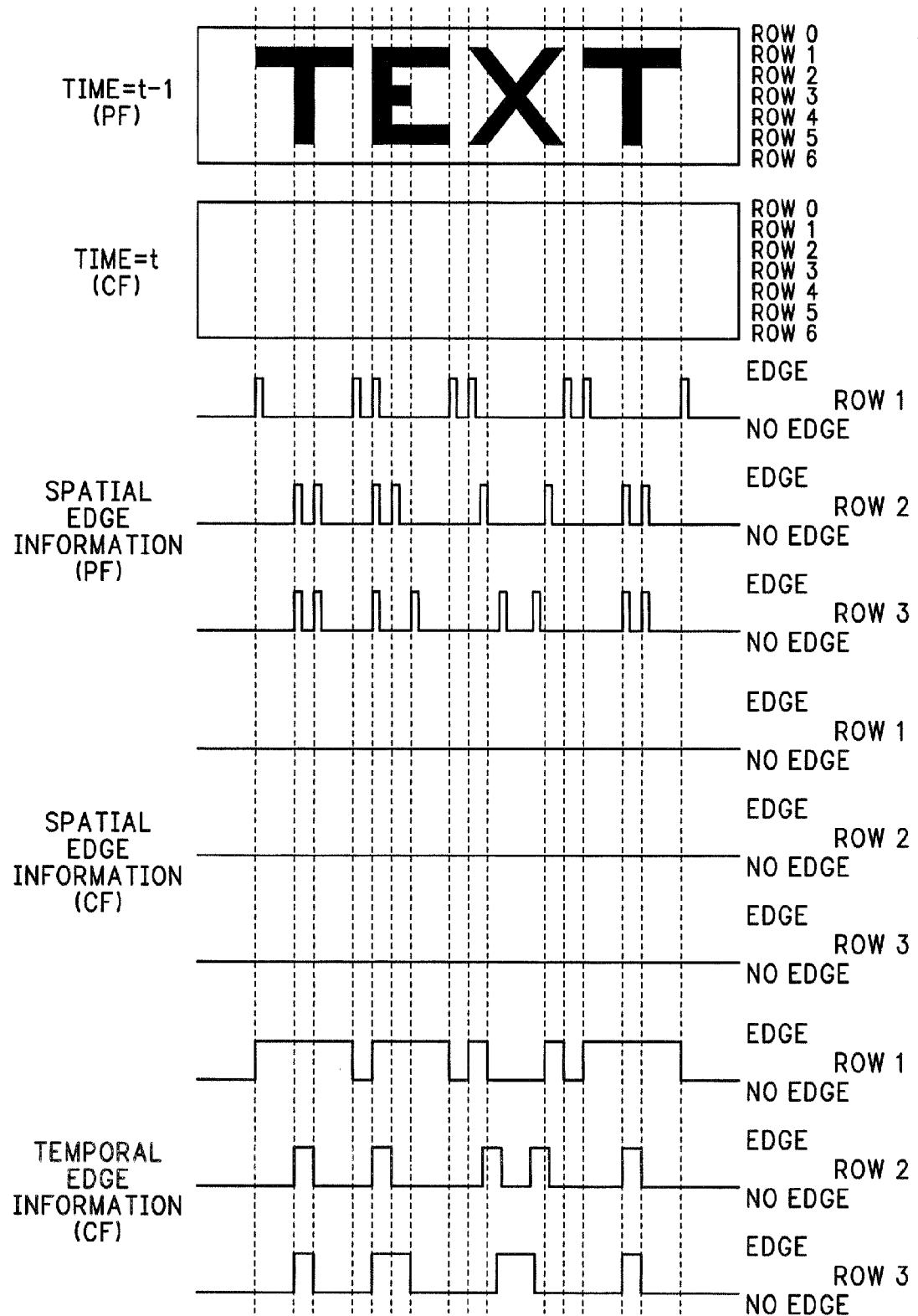
Figure 23 SUBTITLES ON EXIT

SYSTEM AND METHOD FOR DETECTING A NON-VIDEO SOURCE IN VIDEO SIGNALS

This application claims priority from Canadian Patent Application No. 2,330,854. The present invention relates generally to video signal processing, and specifically to a system and method for improved source detection in video sequences.

BACKGROUND OF THE INVENTION

The National Television Standards Committee (NTSC) was responsible for developing a set of standard protocols for television broadcast transmission and reception in the United States. A NTSC television or video signal was transmitted in a format called interlaced video. This format is generated by sampling only half of the image scene and then transmitting die sampled data, called a field, at a rate of approximately 60 Hertz. A field, therefore, can be either even or odd which refers to either the even lines or the odd lines of the image scene. Therefore NTSC video is transmitted at a rate of 30 frames per second, wherein two successive fields compose a frame.

Motion picture film, however, is recorded at a rate of 24 frames per second. It is often required that motion picture film is a source for the 60 Hertz NTSC television. Therefore, a method has been developed for upsampling the motion picture film from 24 frames per second to 30 frames per second, as required by the video signal.

Referring to FIG. 1, a scheme for upsampling the 24 frame per second motion picture film to the 30 frame per second video sequence is illustrated generally by numeral 100. A first 102, second 104, third 106, and fourth 108 sequential frame of the film is represented having both odd 110 and even 112 lines. In order to convert the film frame rate to a video rate signal, each of the film frames are separated into odd and even fields. The first frame is separated into two fields 102a and 102b. The first field 102a comprises odd lines of frame 102, and the second field 102b comprises even lines of the frame 102. The second frame 104 is separated into three fields. The first field 104a comprises the odd lines of second frame 104, the second field 104b comprises the even lines of the second frame 104, and the third field 104c also comprises the odd lines of the second frame 104. Therefore, the third field 104c of the second frame 104 contains redundant information.

Similarly, the third frame 106 is separated into a first field 106a comprising the even lines and a second field 106b comprising the odd lines. The fourth frame 108 is separated into three fields wherein the first field 108a comprises the even lines of the fourth frame 108 and the second field 108b comprises the odd lines of the fourth frame 108. The third field 108c comprises the even lines of the fourth frame 108 and is, therefore, redundant.

The pattern as described above is repeated for the remaining frames. Therefore, for every twenty-four frames there will be a total of 60 fields as a result of the conversion, thus achieving the required video rate of 30 frames per second.

The insertion of the redundant data, however, can have an effect on the visual quality of the image being displayed to a viewer. Therefore, in order to improve the visual quality of the image, it is desirable to detect whether a 30 frame per second video signal is derived from a 24 frames per second motion picture film source. This situation is referred to as a video signal containing an embedded film source. Detection of the motion picture film source allows the redundant data to be removed thereby retrieving the original 24 frames per second motion picture film. Subsequent operation such as scaling is performed on the original image once it is fully sampled. This often results in improved visual quality of images presented to a viewer.

The upsampling algorithm described above is commonly referred to as a 3:2 conversion algorithm. An inverse 3:2 pull-down algorithm (herein referred to as the 3:2 algorithm) is the inverse of the conversion algorithm. The 3:2 algorithm is used for detecting and recovering the original 24 frames per second film transmission from the 30 frames per second video sequence as described below.

It is common in the art to analyze the fields of the video signal as they arrive. By analyzing the relationships between adjacent fields, as well as alternating fields, it is possible to detect a pattern that will be present only it the source of the video sequence is motion picture film. For example, different fields from the same image scene will have very similar properties. Conversely, different fields from different image scenes will have significantly different properties. Therefore, by comparing the features between the fields it is possible to detect an embedded film source. Once the film source is detected, an algorithm combines the original film fields by meshing them and ignores the redundant fields. Thus, the original film image is retrieved and the quality of the image is improved.

A similar process is achieved for PAL/SECAM conversions. PAL/SECAM video sequences operate at a frequency of 50 Hz, or 25 frames per second. A 2:2 conversion algorithm, which is known in the art, is used for upsampling the film to PAL/SECAM video sequence rates. An inverse 2:2 pull-down algorithm (herein referred to as the 2:2 algorithm) is used for retrieving original film frames in a fashion similar that described for the 3:2 algorithm. PAL Telecine A and PAL Telecine B are two standard PAL upsampling techniques.

PAL Telecine A does not insert repeated fields into the sequence during the transfer from film frame rate to video frame rate. Thus, 24 frames become 48 fields after the Telecine A process. The result of having two fewer fields than the video rate is a 4% (2 fields missing out of the required 50 fields) increase in the playback speed. In order to transfer PAL Film to PAL Video without the 4% speedup, a process called Telecine B is used. Telecine B inserts a repeated field into the sequence every ½ second (i.e. every 25th field). Inclusion of a repeated field produces a sequence that plays back without speedup for a 25 frames per second video rate.

However, the film detection algorithms as described above are subject to problems. Static objects such as subtitles and other icons may be inserted at a video rate after the film has been converted to video. These objects typically cause the film detection algorithm to fail so that the series of contiguous image scenes, that is contiguous frames of film, cannot be properly recovered. The result of these problems is the display of original film images as though they were true video source. It is therefore, an object of the present invention to obviate or mitigate the above mentioned disadvantages and provide a system and method for improving the detection of film in a video sequence.

SUMMARY OF THE INVENTION

In accordance with an aspect of the present invention, there is provided a system and method for detecting a non-video source embedded in a video sequence and providing direction to a deinterlacing algorithm accordingly. The system comprises a signal generator for generating a plurality of signals. The signals are generated in accordance with pixels input tom the video sequence.

The system further comprises a plurality of pattern detection state machines, each for receiving the signals and for detecting a pattern in the video sequence. The pattern is detected in accordance with a preset threshold, wherein the pattern detection state machine varies the preset threshold in accordance with the received signals.

The system further comprises an arbiter state machine coupled with the plurality of pattern detection state machines for governing the pattern detection state machines and for determining whether or not a non-video source is embedded in the video sequence.

BRIEF DESCRIPTION OF THE DRAWINGS

Embodiments of the present invention will now be described by way of example only with reference to the following drawings in which:

FIG. 22 is a schematic diagram of the signals generated for subtitle detection upon subtitle entry.

FIG. 23 is a schematic diagram of the signals generated for subtitle detection upon subtitle exit.

DETAILED DESCRIPTION OF THE PREFERRED EMBODIMENTS

Figure 1:
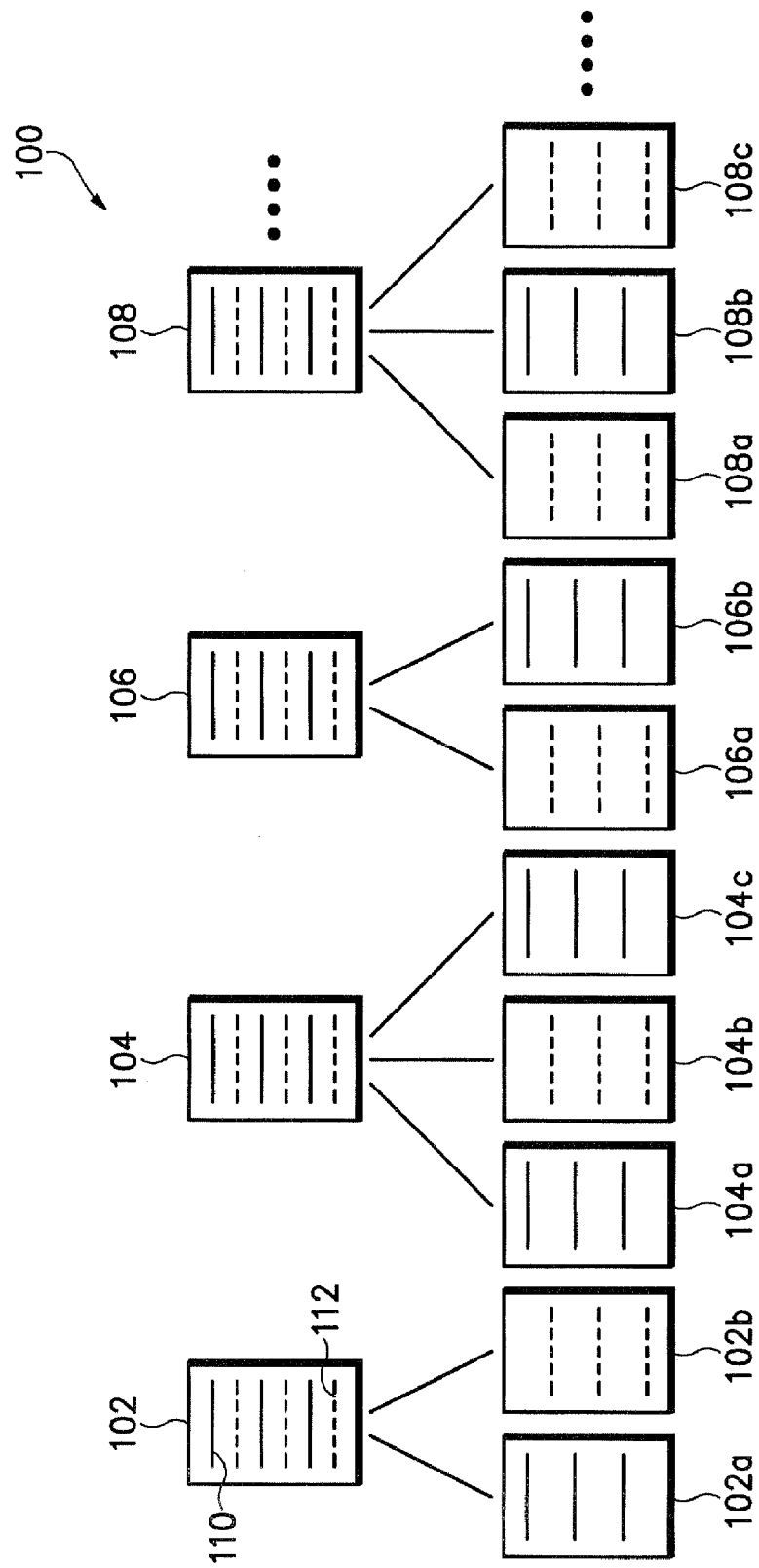
FIG. 1 is schematic diagram of a 3:2 frame conversion algorithm (prior art)

A system is described for detecting whether a video signal, such as NTSC, PAL or SECAM, contains an embedded film source. Each of the different types of embedded sources within a video signal is referred to as a mode. The modality of rile incoming video signal is determined and is subsequently used by a deinterlacing algorithm. The details of the deinterlacing algorithm are beyond the scope of the present invention and will be apparent to a person skilled in the art. Modality detection and recognition are used for directing the deinterlacing strategy such that it maximizes the visual quality of the output image for a format-conversion.

The system also implements pattern detection and analysis for identifying other less traditional patterns that are characteristic of computer video games. These different sources do not necessarily follow the 3:2 or 2:2 pattern. Therefore, the system is capable of implementing an N:M Autonomous State Machine that Searches for repetitive patterns other than the 3:2 and 2:2 patterns.

Patterns in an incoming video source are detected by a hierarchical state-machine structure. The hierarchical structure contains a supervisory component, or arbiter state machine, and several subordinate components. For simplicity, each subordinate component is responsible for performing a pattern analysis and detection of a specific pattern. The subordinate components are implemented in the form of state machines that execute reconfigurable detection algorithms. These algorithms have several input signals that are generated using various methods that will be described in greater detail later in this description. The input signals are generated from the incoming video fields by examining the image structure and content. The architecture is such that any new state machine can be easily added in the existing framework. Therefore, any new patterns that would be useful to detect and track can be included and used for directing the deinterlacing algorithm.

The following embodiment details an enhanced pattern detection method that performs 3:2 and 2:2 detection for an embedded film source. Additionally, the embodiment details the workings of an algorithm that is used to recognize less typical patterns that could be present in the incoming video signal. Accurate identification of the modality of the interlaced input video can improve the image quality during formal conversion. An example of formal conversion is altering an NTSC interlaced source to a progressive output signal. The film modality algorithms are used for detecting and identifying the differences between Video Mode Sources, NTSC Film Sources (3:2), and PAL/SECAM Film Sources (2:2).

The algorithm searches for specific patterns in the incoming video signal that can be used to identify the modality of the video source. The algorithm fisher utilizes pattern detection for identifying regions in the video source that may cause modality identification to falter, thereby achieving a more robust further of identification. These regions include structural edges, objects inserted after filming (such as logos and subtitles), and the like.

The algorithm can be implemented entirely in hardware. Alternately, the algorithm may be implemented as a combination of hardware and software components. The latter implementation is preferred, as it is often more flexible.

Figure 2:
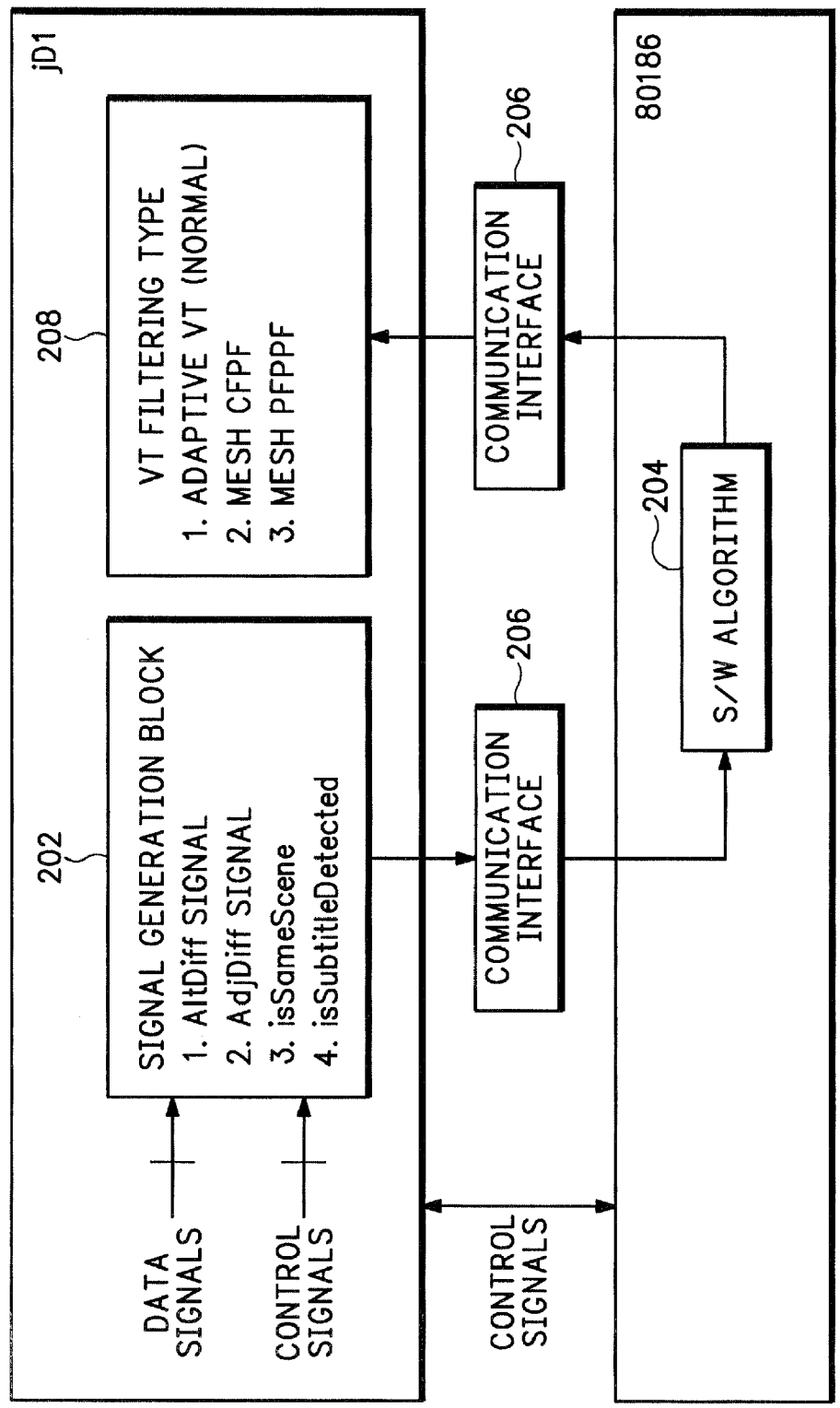
FIG. 2 is a block diagram of system for implementing a frame rate detection and conversion algorithm.

Referring to FIG. 2, a system for implementing the algorithm is illustrated generally by numeral 200. A signal generation block 202 communicates with a software module 204 via a communication interface 206. The software module 204 communicates, in turn, with a vertical-temporal (VT) filter block 208 via the communication interface 206.

The signal generation block 202 includes sections of the algorithm that directly access pixel data. These sections include an Alternating Field Signal Generator, an Adjacent Field Signal Generator, a Histogram Generator, and a Subtitle Detector.

The software module 204 uses signals output from the generators listed above for determining the mode of the source. It is anticipated for the present embodiment that the detection algorithms will be running on a microprocessor such as an 80186. The algorithm determines and tracks the correct mode of the video sequence and instructs a de-interlacing algorithm resident in the VT filter block 208 to apply the most appropriate de-interlacing modes. The various VT de-interlacing modes include typical VT filtering (both common and proprietary methods) which is applied if the modality of the video signal is True Video, Current Field (CF) and Previous Field (PF) meshing, and PF and Previous Previous Field (PPF) meshing. The Previous Previous Field (PPF) is the field immediately prior in time to the Previous field.

The following sections detail the hardware blocks used for generating the various signals required by the 3:2/2:2 detection algorithm. Each source pixel is used only once during the generation of the signals rendering the signal generation stage immutable to factors such as zooming as well as other special signal processing functions.

A window consisting of a fixed number of columns and rows in the current field (CF), and a window consisting of another fixed number of columns and rows in the previous field (PF) is available for use in 3:2/2:2 detection. The windows are usually restricted in size to less than 5 by 5 for the CF and 4 by 5 for the PF, and they are spatially interleaved. Together the grouping of CF pixels and PF pixels define a region of interest, or a decision window. It is in this window that many of the primitive signals are generated for subsequent pattern analysis.

Figure 3:
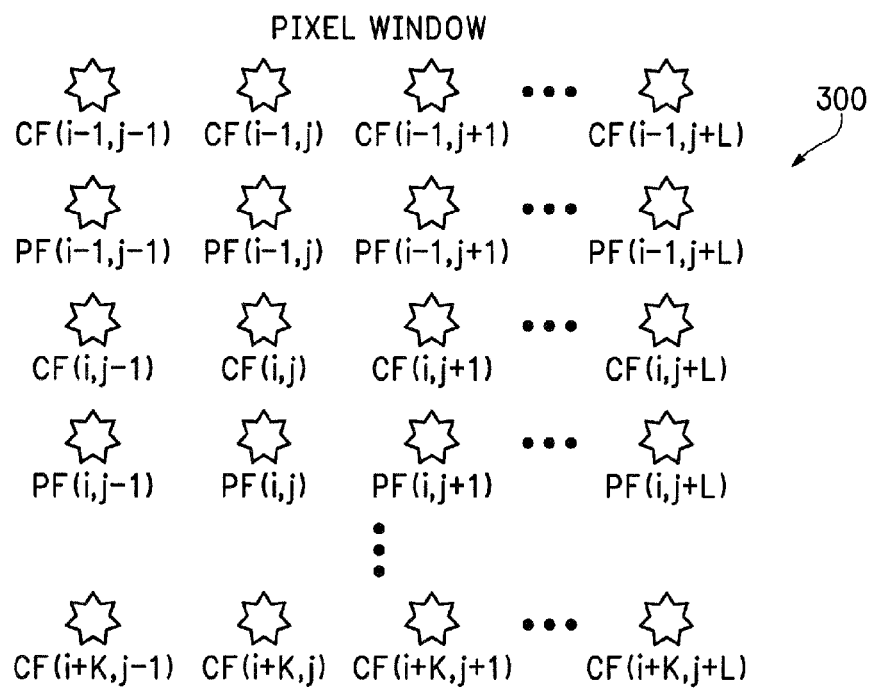
FIG. 3 is schematic diagram illustrating a pixel window used for analysis.

Referring to FIG. 3, the CF and PF windows are illustrated generally by numerals 300. A naming convention for the CF and PF pixels is defined as follows. A pixel in the Current Field in the ith row and the jth column is denoted as $CF(i,j)$. Pixels in the Previous Field are denoted in a similar fashion as $PF(i,j)$. For both naming conventions, let i denote the vertical position and j denote the horizontal position in the respective field. The CF and PF are spatially offset vertically by one line. Therefore, while $CF(i,j)$ and $PF(i,j)$ correspond to pixels that belong to the same column, they do not correspond the same vertical position.

Signal Generation

Figure 4:
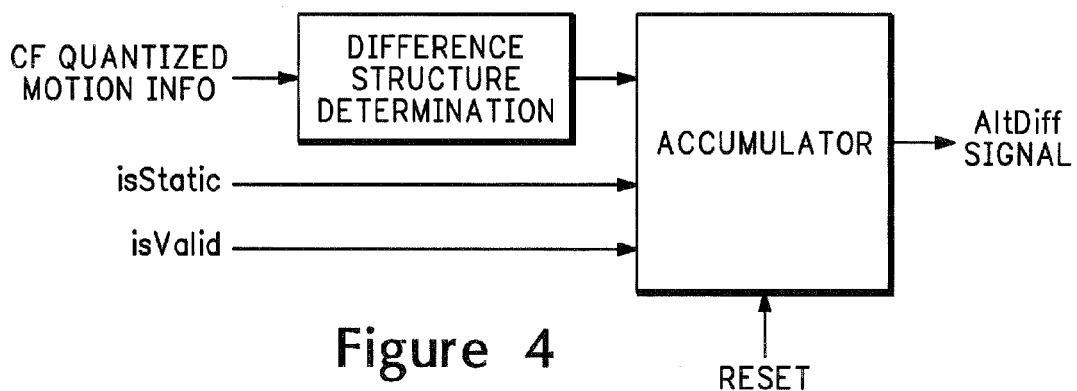
FIG. 4 is a block diagram of an alternating field signal generator.

Referring to FIG. 4, the Alternating Field Signal Generator Is illustrated generally by numeral 400. A quantized motion value 402 is input to a structure difference generator 404. The output of the generator 404, an enable signal isValid, and a reset signal reset are input to an accumulator 406.

The structured difference generator 404 computes a structured difference between pixels by accounting for structural information such as lines, edges, feathering and quantized motion. The structured difference is a more complicated method of generating field difference signals than a simple subtraction of pixel values. The structured difference is controlled by rules and user-defined thresholds that are used for deciding the types of image structures that are present. The structured difference generator will be described in greater detail further on.

The accumulator 406 accumulates the quantized motion information for the pixels in a field and outputs a signal AltDiff once per field. The signal AltDiff is an indicator of change or relative spatial movement between the CF and the PPF. While such a change is not a true measure of the motion between alternating fields, it provides a measure of motion sufficient for the purposes of the algorithm. Throughout the remainder of the description, this change is referred to as motion.

The AltDiff signal is short for Alternating Difference. The AltDiff signal is generated on a field-by-field basis and is a difference signal that is generated by accumulating those quantized motion differences whose magnitude exceeds a programmable threshold. The quantized motion differences are taken between two fields of the same polarity. That is, the difference is taken between two successive even fields or two successive odd fields. Therefore, if the quantized motion difference is sufficiently large, as measured against a programmable threshold, it will contribute to the AltDiff signal. The signal AltDiff is set to 0 at the beginning of each analysis.

The quantized motion information for each pixel is computed by taking a difference on a pixel-by-pixel basis. The difference is quantized to N bits, by comparing the difference to a series of thresholds. The number of thresholds defines a number of levels of motion. For example, if there are three thresholds, 0, 170, and 255, then there are two levels of motion. If the difference falls between 0 and 170 it is considered to have a first motion level. If the difference falls between 171 and 255 it is considered to have a second motion level. Typically, there are a greater than two levels.

The number of bits required for storing the quantized motion information depends of the various levels of motion defined. In the present embodiment, a programmable number of levels of motion are defined up to a maximum of 16, each level having a numerical value of 0 through 15. Therefore, four bits are required for storing the level of motion for each pixel. The motion information is appended to the pixel data for each pixel.

The levels of motion can be defined in more descriptive terms by the use of labels. For example, depending on the level of the motion, a pixel can be considered to be STATIC, MOVING, MOVING FAST, MOVING VERY FAST and so on, so that a sufficient number of levels are used to properly treat the processed image.

An absolute difference is taken between the $CF(i,j)$ pixel wind the pixel $PPF(i,j)$, where i and j refer to the ith row of the jth column in the source image. In the present embodiment, the number of bits of pixel information is 8, and therefore, there can be a maximum difference of 255 between pixels. Thresholds are determined for quantizing difference ranges so that for the levels of motion as described above have a predefined range. For example, a pixel that is considered static will have a $CF(i,j)-PPF(i,j)$ difference in magnitude less than a programmable threshold, but is usually small (about 5). The range in which the inter-frame pixel difference falls corresponds to the level of motion for that pixel, and the four-bit quantized level of motion information is appended to the pixel information.

Referring once again to FIG. 4, if the enable signal isValid is high and the motion information for the $CF(i,j)$ pixel is greater than a predefined motion threshold, then the signal AltDiff is incremented. Therefore, the output signal AltDiff is a signal representative of the number of pixels in a neighborhood about the interpolated target pixel that exceed a predefined motion threshold. The AltDiff signal is used by the detection algorithm to assist in the identification of 3:2/2:2 and True Video modes.

The isValid signal allows algorithms that use pixel information to know whether the pixel information has already been examined for a specific purpose. The isValid signal is encoded along with the pixel. One bit is used for this purpose. For example, during image interpolation where the image is being scaled to a larger format, the same source pixels may be used multiple times to create the larger image. When generating control signals, such as a 3:2 detection signal, it is only desired to account for a pixel's contribution once. The isValid bit provides such control to the pattern analysis algorithm.

Figure 5:
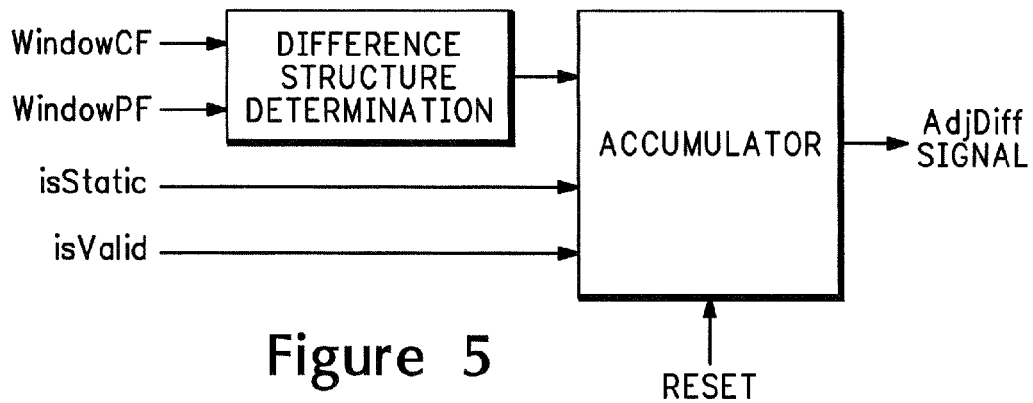
FIG. 5 is a block diagram of an adjacent field signal generator.

Referring to FIG. 5, an Adjacent Field Signal Generator is illustrated generally by numeral 500. The signal generator 500 uses. Pixels in the CF window and pixels in the PF window are input into a structured difference generator 502. The output of the structured difference generator 502, an enable signal isValid, a static indicator signal isStatic, and a reset signal reset are input to an accumulator 504. The accumulator 504 accumulates motion information for the pixels in a field and outputs a signal AdjDiff. The signal AdjDiff represents information regarding the amount of motion between two adjacent fields, that is the CF and the PF. The purpose of AdjDiff signal accumulation is to obtain a measure of the degree of inter-field motion for adjacent fields.

The AdjDiff signal is short for Adjacent Difference. The AdjDiff signal is generated on a field-by-field basis. It is the difference signal that is generated by taking the structured difference between two fields of different polarity. That is, taking the structured difference between an adjacent even and odd field.

The accumulation of the AdjDiff signal is described as follows. The AdjDiff signal is set to 0 at the beginning of each field, by activating the reset signal reset, The isMotion signal denotes which pixels should be accumulated while the isStatic signal indicates which pixels should not be accumulated (that is, which pixels are static). The accumulator only increments if there is motion (the isMotion signal is True) and the pixels are not static (the isStatic signal is False). This improves robustness of the AdjDiff signal by reducing its susceptibility to structures such as edges.

However, certain structures, such as static edges may be misconstrued as inter-field motion using only pixel information in the CF and PF fields. Therefore, the accumulator 504 uses information relating to the static nature of the pixel in a neighborhood about the target pixel for determining whether a particular source pixel in the region of interest is part of a static edge.

For instance, if it is determined that the pixel is part of a static edge, then the static signal isStatic is asserted. Assertion of the isStatic signal prevents the pixel information from being accumulated by the generator 500.

In addition, the accumulator 504 uses pixel information for determining if motion structure exists. Motion structure occurs when a "feathering" artifact is present. The feathering artifact is a result of a structure undergoing relative motion in the CF and PF fields. Examining the CF and the PF window information, and determining the number of pixels that exhibit potential feathering, is deemed under many conditions to be a reasonably reliable indicator of whether two fields originated from the same or different image frames. The exception for this is static. Therefore, static information is also given some weighting in the decision process.

The motion structure calculation determines whether a feathering artifact exists between the CF and PF Windows. If motion is present, the motion signal isMotion is affirmed. This calculation is based on an examination of the column coincident with the column of the target pixel.

Figure 6A:
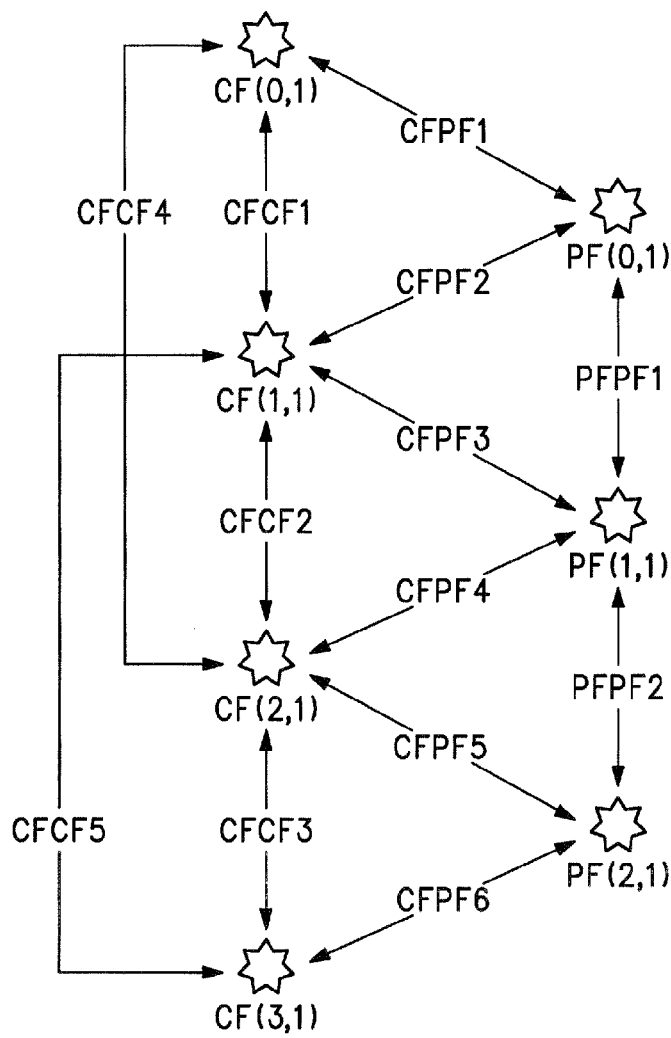
FIG. 6a is a schematic diagram illustrating how the nomenclature for pixel differences is defined.

Referring to FIG. 6a, an array of pixels is illustrated generally by numeral 600. A naming convention is defined as follows. Similarly to FIG. 3, current field pixels are referred to as CF(i,j) and previous field pixels are referred to as PF(i,j). Differences between Current Field pixels are referred to as CFCFa for the difference between pixels CF(a-1,y) and CF(a,y). Differences between Previous Field pixels are referred to as PFPFb for the difference between pixels PF(b-1,y) and PF(b,y). Differences between Current Field pixels and Previous field pixels are referred to as CFPF1 for the difference between pixels CF(0,1) and PF(0,1), CFPF2 for the difference between pixels CF(1,1) and PF(0,1), CFPF3 for the difference between pixels CF(1,1) and PF(1,1) and so on.

For motion structure calculation, source pixels in the CF, specifically two pixels immediately above and two pixels immediately below the target pixel position are compared with the corresponding pixels in the PF. The level of motion is determined in the region of interest in accordance with the comparisons. For the purposes of the description, it is assumed that two pixels in each of the CF and the PF are compared. For example, CF(1,1) is compared with PF(1,1), CF(2,1) is compared with PF(1,1), and CF(2,1) is compared with PF(2,1). If the absolute value of the difference of each comparison is greater than a predetermined threshold and either i) all the CF pixels values are greater than the PF values; or ii) all the PF pixels values are greater than the CF values, then motion is deemed present in region of interest. The thresholds are, in general, programmable, but typically take on a value of approximately 15. The value may vary depending on the level of anticipated noise in the image scene.

Alternately, CF(1,1) is compared with PF(0,1), CF(1,1) is compared with PF(1,1), and CF(2,1) is compared with PF(1,1). If the absolute value of the difference of each comparison is greater than a predetermined threshold and either all of the CF pixel values in the region of interest are greater than the PF pixel values or vice versa, then motion is present in the image.

Figure 6B:
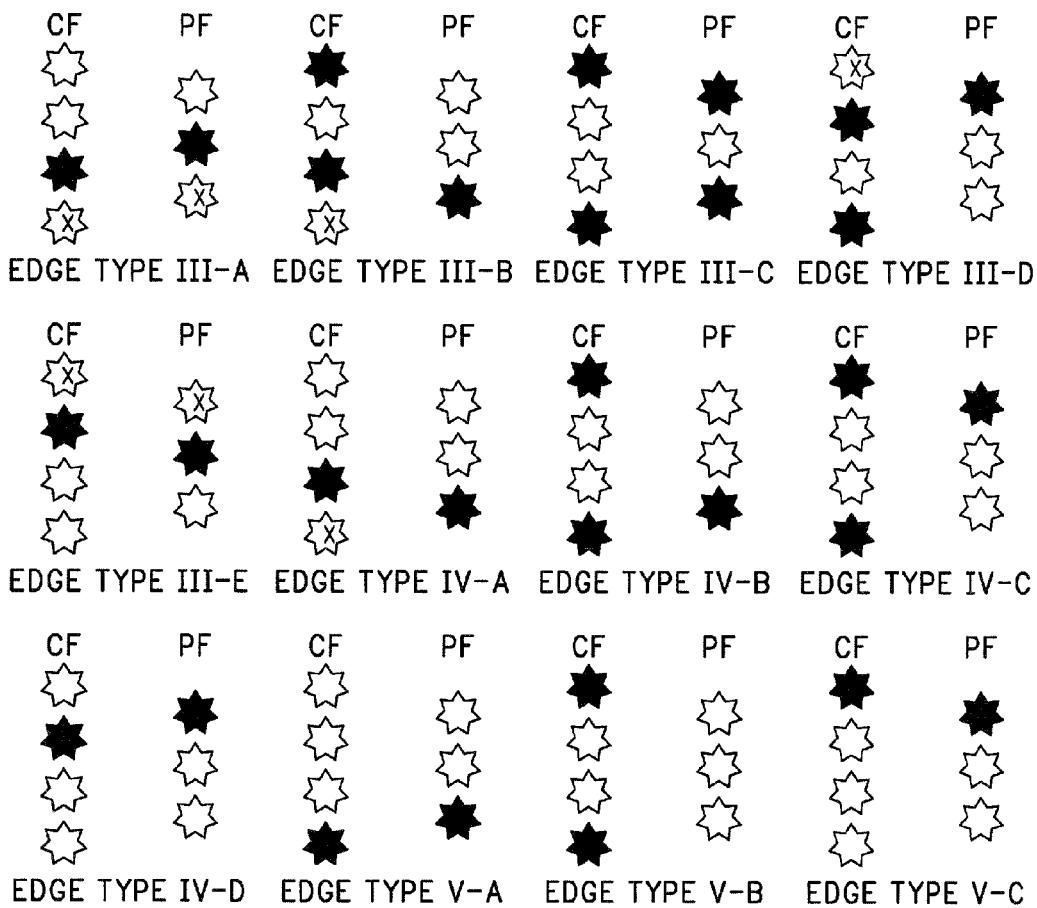
FIG. 6b is a schematic diagram illustrating a subset of structured differences for various edge types.
Figure 6C:
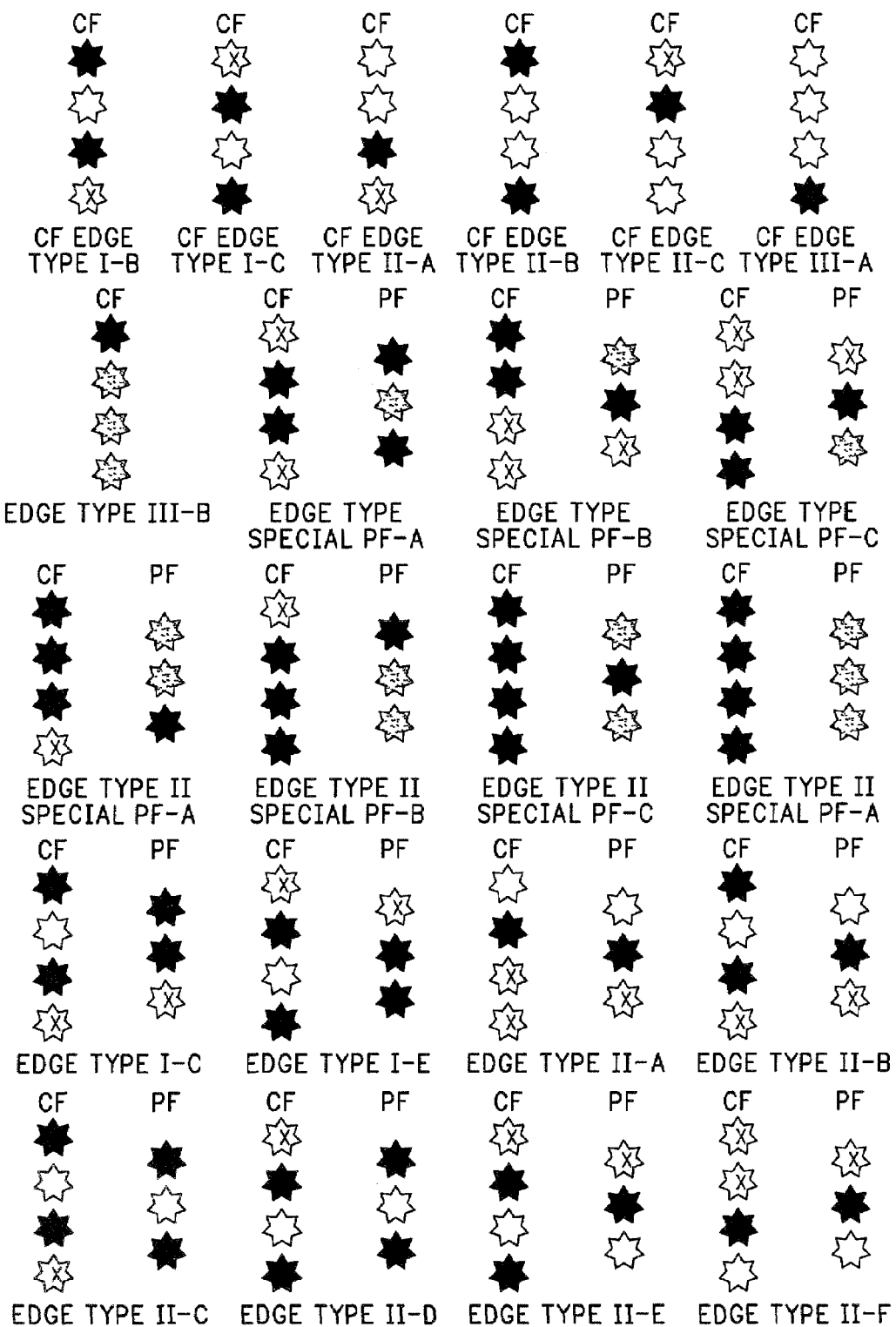
FIG. 6c is a schematic diagram illustrating a subset of various structured differences that represent a feathering artifact.

FIG. 6c represents some of the structured difference patterns that are associated with a feathering artifact in interlaced sources. It should be noted that feathering is a necessary, but not sufficient condition for inter-field motion to be present. That is, feathering is a strong indicator that inter-field motion might be present. By detecting feathering using the method described above, and further correlating this information with persistence information associated with each pixel, it is possible to get a good indication as to whether the CF and PF fields are undergoing relative motion. That is, whether the true interlaced feathering artifact is present in the region of interest.

Referring to FIGS. 6a and 6b, the structured difference generator is described in greater detail. The structured difference calculations use quantities such as CFCF1, CFPF2 and so on, for providing boolean information to indicate whether a specific structure difference, or structured edge type, is present in the region of interest.

In FIGS. 6b and 6c, light and dark pixels in the diagrams indicate a structural difference of note between pixel intensities on a per channel basis. The patterns illustrated in FIG. 6b are a partial enumeration of some of the various structural edge patterns that can be detected. A specific pattern is detected based on the combination of the differences computed in FIG. 6a. The pixels marked by an "x" indicate "don't care" pixels. For example, Edge Type III-A corresponds to the following condition being satisfied:

Edge Type III-A=Abs(CFCF1)<T1 AND Abs(CFPF1)<T1 AND Abs(CFPF2)<T1 AND Abs(CFCF2)>T2 AND Abs(PFPF1)>T2 AND Abs(CFPF4)<T1 AND Abs(CFPF3)>T2

Therefore, Edge Type III-A is present if the above boolean statement evaluates to true. The thresholds T1 and T2 are programmable. Boolean statements for the other structured edge types can be similarly determined.

Once a specific edge type is asserted, other conditions are applied to further qualify the nature of the behavior of the pixels in the region of interest. These further conditions test the specific edge type for specific structured motion difference information that is associated with each pixel. The subsequent information is used to help determine whether the specific pattern has persisted across many successive fields. Should it be determined that the specific pattern has persistent for eight fields, for example, the determination that the pixel pattern is true part of a stationary (static) portion of the image scene becomes more clear. If it is deemed part of a structural edge, and not part of a feathering artifact, then the contribution to either the AltDiff or the AdjDiff signals is muted.

The subsequent persistence check is required to exclude the possible presence of fine detail in the CF and PF fields. A static field containing black in the CF and white in the PF will appear gray to the viewer. Had the AdjDiff and AltDiff signals been driven only by a feathering detector, then the presence of static fine detail would contaminate the clarity of these signals. It is thus an improvement to be able to correlate structured motion information with the structured difference information when computing AdjDiff and AltDiff.

Figure 7:
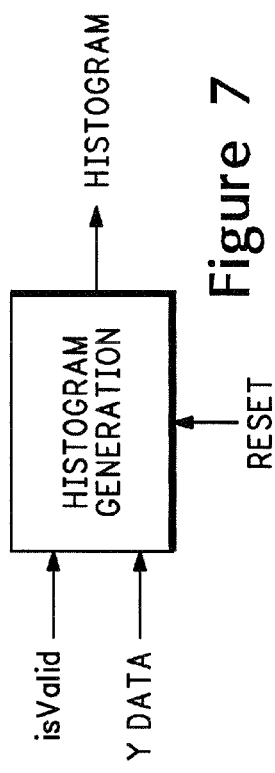
FIG. 7 is a schematic diagram of a histogram generator.

Referring to FIG. 7, a Histogram Generator is illustrated generally by the numeral 700. The histogram generator 700 has an enable signal isValid, the CF(0,1) pixel, and reset signal RESET as its input. The generator outputs a boolean scene signal isSameScene, which is representative of the distribution of the luminance data content for a given field.

It is assumed that each source pixel is used once. The enable signal isValid prevents a source pixel from contributing to the histogram more than once, which is a possibility where the source image is being zoomed.

The scene signal isSameScene indicates whether the CF and the PF are part of the same image scene. A scene change causes the isSameScene signal to be false. Fields originating from the same image scene can originate front the same frame of film, or sequence of frames (for example, a sunset). A scene change occurs when two different image scenes are spliced together (for example, a tennis game followed immediately by a sequence of a space shuttle in orbit).

If a scene change occurs, it is possible that the pattern detected by the 3:2/2:2 algorithm has been interrupted. Therefore, if a change in scene is detected, this information is used to modify the thresholds in the state machine. That is, the algorithm makes the thresholds is for detecting the 3:2/2:2 pattern less strict than if the scene,e is deemed to be the same. Conversely, the thresholds are made stricter if the scene is deemed to have changed. In this way corroborative information is used to help maintain the current operation mode, either 3:2/2:2 or some other mode defined in software. This also helps to prevent mode switching. Mode switching can be visually displeasing and occurs when the Arbiter State Machine decides to drop out of or fall into a particular processing mode.

Alternately, if it is determined that the source has switched (for example, advertisements at a video rate inserted between the tennis match and the space shuttle in orbit), the algorithm adjusts accordingly.

Scene changes can be detected by examining the histogram of the Y (or Luminance) channel. If two adjacent fields originated from the same scene, their histograms will be closely correlated. It is rare for two fields from different scenes to exhibit similar histograms.

In the present embodiment, 8 bins are used for histogram generation, although it will be apparent to a person skilled in the art that the number of bins is arbitrary. Each bin, therefore, represents $\frac{1}{8}^{th}$ of the Y channel. A 21-bit accumulator (assuming the maximum image resolution is 1920× 1080) is required. Therefore, the 8 bins each comprise a register of 21 bits in size for calculating the current field histogram. Eight (8) additional registers of 21 bits in size are required for storing the previous field histogram. The CF histogram is compared with the PF histogram.

The eight registers used for the current field histogram are referred to as currHist[0] through currHist[7]. Similarly, the eight registers used for the previous field histogram are referred to as prevHist[0] through prevHist[7]. In general, the bins will not be of equal width, since luminance data does not always use the full 8-bit dynamic range. For example, the Y (luminance) signal ranges from 16–235 (inclusive) in the YCrCb color space. In general, the levels used by a channel in a given color space are programmable. Since 8 does not divide evenly into 220, the last bins, currHist[7] and prevHist[7], have a smaller range (width) than the rest. The registers are set to 0 at the beginning of each field, by activating the reset signal reset.

If the isValid signal indicates that the pixel has not yet contributed to the histogram then its luminance value is examined. The generation of the histogram information is performed as follows. Let R(k)=[L(k),U(k)] be a set that defines a range between a lower threshold L(k) and an upper threshold U(k) such that $L(k) \leq U(k)=L(k+1)$ for k=0 through 6, where U(7) is usually set to 255 where the last upper boundary is included. Then as Y falls into R(k), currHist[k] is incremented. The values of L(k) and U(k) are programmable.

The scene signal isSameScene is calculated by comparing the histogram associated with the Previous Field with the histogram associated with the Current Field. The scene signal isSameScene is a boolean value for representing either a scene change or no scene change. There are many possible methods for generating the isSameScene signal and it can, in general, be a composite of many conditions, which together, are used to generate the isSameScene signal.

One condition used in the generation of the isSameScene signal takes the difference between the corresponding bins of the currHist[i] and the prevHist[i] for i=0 . . . 7. If any of these differences exceed a predetermined programmable threshold, the condition is true. Prior to subtraction, the currHist[i] and the prevHist[i] information may be quantized using a programmable right-barrel shifter. Shifting a positive binary number to the right divides the number by two, thereby making it smaller. This function naturally quantizes the number by using only the desired number of most significant bits.

A secondary condition used in the generation of the isSameScene signal accumulates the absolute differences between the currHist[i] and the prevHist[i] for all i. If the sum of the absolute differences, referred to as histSum, exceeds a threshold, the second condition is affirmed. The threshold is programmable. For many applications, an 11 bit length register is sufficiently large to store the histSum value. This size allows for a count value up to 2047. Any value exceeding this count should be clamped. The isSceneChange signal is affirmed if either one of the aforementioned conditions is met.

The values exemplified above are not atypical because they could be used to represent the maximum specific resolution of High Definition Television (HDTV), known as 1080i. These values may increase in subsequent years so programmable length registers are used to accommodate future formats.

Figure 20:
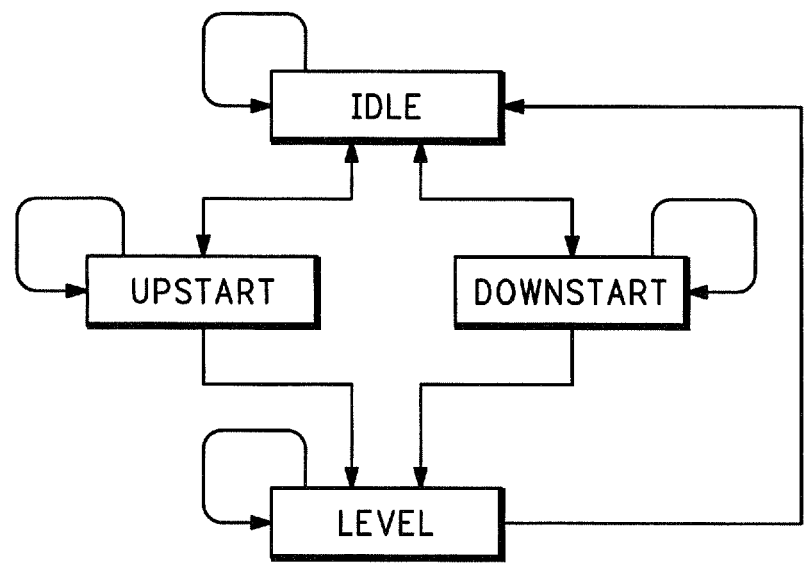
FIG. 20 is a schematic diagram of a state machine for detecting subtitles.

Referring to FIG. 20, a Subtitle Detection State Machine is illustrated. The Subtitle Detection State Machine uses a number of different calculations to determine whether a row is part of a subtitle. The calculations look for temporal and spatial edges within an image.

The subtitle detection state machine outputs a subtitle signal isSubtitle for indicating whether a subtitle is detected in the source image. This information is useful once in the 3:22:2 mode For a video sequence, the signal isSubtitle can be affirmed frequently, but is not always significant. The signal isSubtitle is significant when in the 3:2/2:2 mode and when the correlation of adjacent fields is expected to be, Low, an indication that they originated from the same frame of film.

Subtitles in film are often included at video rates and are not part of the original film source. Subtitles are relatively static because they must be displayed long enough for a viewer to read them. However, the insertion of subtitles at video rates may confuse the a 3:2 State Machine possibly leading it to mistakenly conclude that a source video signal is a True Video sequence when it is actually an embedded film source. By detecting subtitles, the 3:2/2:2 State Machines become more resilient to the inclusion of video rate subtitles, that force the tracking algorithms to reject the presence of both the 3.2 and 2:2 modes.

To determine whether a subtitle exists within a field, a Subtitle Stale Detection Machine is fed pixel value information from the current and previous fields on a row-by-row basis. The pixel information is used to determine whether a row is part of a subtitle. If a predefined number of consecutive rows indicate the existence of a subtitle, the field is considered subtitled, and the signal isSubtitle is set High. Otherwise, the signal remains Low.

The state machine searches for a row of pixel-values that exhibit certain wave-like properties. The wave-like properties are programmable in general, but for the purposes of detecting subtitles, the properties are typically a high frequency sequence of alternatively high and low pixel values. Such a sequence could well be indicative of text of the subtitle. It is very unlikely that such a sequence will exist in a field in the absence of a subtitle. Therefore, if the number of high-low sequences in a given row exceeds a predefined threshold, and the pattern is repeated for a predefined number of successive rows, it is determined that a subtitle is present in the video signal. Furthermore, by recording the beginning and ending point of the high-low sequence, and the corresponding cluster of rows, it is possible to specify the region in the image scene that is occupied by the subtitle.

In addition to the wave signal, the inter-frame differences (quantized motion information) is also used for determining whether a number of successive, pixels are static. This helps the decision making process and makes the subtitle detector more robust.

The Subtitle Detection State Machine is composed of two smaller embedded detection state machines, each of which runs in tandem. The embedded state machines exploit the fact that a subtitle must first appear (subtitle entry) in one field and then disappear (subtitle exit) a number of fields later. Typically, a subtitle appears first in the CF and then in the PF. The subtitle first leaves the CF and then leaves the PF. One way to capture this behavior is to run a CF Subtitle Detection State Machine that detects the subtitle entry in the CF and a PF Subtitle Detection State Machine that is used to detect subtitle exit in the PF. This represents one of many possible approaches to implementing state machines for detecting subtitles. Many other functionally similar incantations are possible as will be appreciated by a person skilled in the am. The operation of the subtitle detection state machine is described in detail further on in this description.

Software Module

Figure 21:
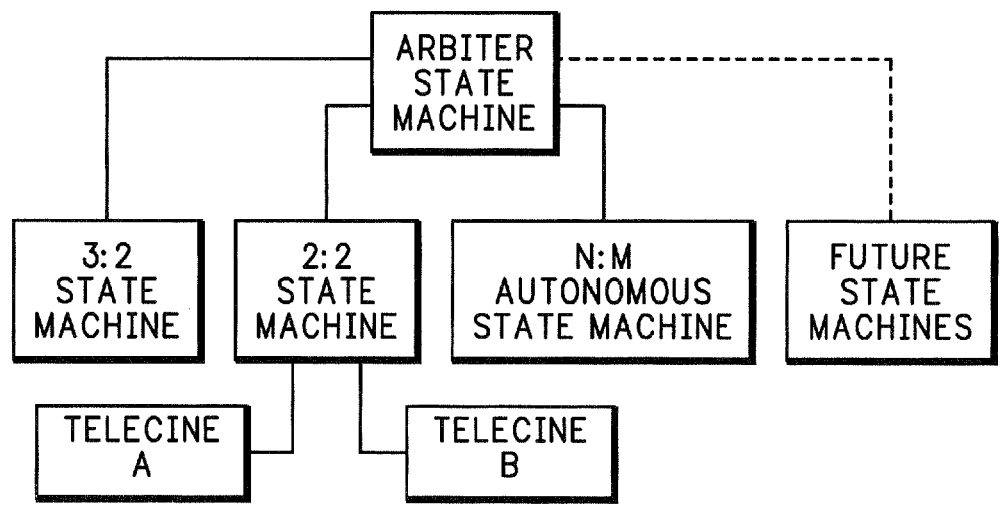
FIG. 21 is a schematic diagram of the hierarchical state machine architecture.

The software module comprises a data memory block (for storing a history of data), and a series of state machines that are used for the purposes of pattern analysis and recognition. Referring to FIG. 21, a hierarchy is of state machines is represented generally by numeral 2100. An arbiter state machine 2102 governs a plurality of subordinate state machines. These subordinate state machines include pattern specific state machines, such as a 3:2 state machine 2104, a 2:2 state machine 2106, a N:M state machine 2108, and other state machine reserved for future algorithms 2110.

The 3:2 state machine 2104 executes a software based reconfigurable pattern detection and analysis algorithm that serves to discern whether the underlying video signal contains a 3:2 pattern. The 2:2 state machine 2106 executes a software based reconfigurable pattern detection and analysis algorithm serves to discern whether the underlying video signal contains a 2:2 pattern. The N:M state machine 2108 executes a software-reconfigurable pattern detection and analysis algorithm which serves to discern whether the underlying video signal contains a N:M pattern.

All subordinate state machines run concurrently. Furthermore, the subordinate state machines may have their own subordinate state machines. For example, a Telecine A state machine 2112 and a Telecine B state machine 2114 are subordinate to the 2:2 state machine 2106.

The Arbiter State Machine

The arbiter state machine is used for resolving conflicts (or ambiguities between lower level state machines. For example, suppose the 3:2 state machine and the 2:2 state machine each indicate that the underlying video signal contains a 3:2 and a 2:2 pattern respectively, at the same time. Both state machines cannot be correct because a video signal cannot contain both a 3:2 source and a 2:2 source simultaneously. In this respect the presence of the two patterns at the receiver is mutually exclusive. In the event that the 3:2 signal is active and the 2:2 signal is active, the arbiter state machine determines how to direct the deinterlacing algorithm. One outcome may have the arbiter state machine direct the deinterlacing algorithm to treat the incoming video signal as true video.

Thus, the arbiter state machine allows only one possible outcome. Either the signal will indicate the presence of 3:2, 2:2, N:M, or none of them, but never two at the same time. The arbiter state machine contains rules of precedence that aim to resolve any conflicts that arise during signal detection by subordinate state machines. Within each of the subordinate state machines there are smaller logic components that serve as connective logic. Each of the subordinate state machines uses the primitive pattern analysis signals isSameScene, isSubtitle, AltDiff, and AdjDiff.

The AltDiff and AdjDiff signals are stored in the data update block. The five most recent values are stored for each signal. Storage for these signals is usually implemented in the form of a circular queue because it is a convenient way to track signal history. For example, the circular queues can be implemented as two arrays of 32-bit integers. The most recent data is kept at the head of the queue, and the oldest data is stored towards the tail.

The ten most recent isSameScene values are stored in the data update block. This is currently implemented using a circular queue containing sufficient storage for ten Boolean values.

The five most recent isSubtitle values are stored in the data update block. This is currently implemented using a circular queue containing containing sufficient storage for five Boolean values.

The 3:2 State Machine

The 3:2 state machine is used to help determine whether to switch into 3:2 processing mode or whether to remain in (or switch back into) true video mode. However, the final decision whether 3:2 based deinterlacing will take place resides with the arbiter state machine. The 3:2 state machine makes use of the generated signal information, along with the isSameScene and isSubtitle information to help decide when to change state. State changes not only determine whether a 3:2 pattern is present, but also identify the location of the video signal in the 3:2 pattern. The state machine can be implemented in hardware or software, the latter being more flexible.

The input data mode, as determined from the input video signal, can be obtained by analyzing a time-based pattern of the AltDiff and AdjDift signals, In NTSC Video, odd and even fields of a frame are captured one after another and have an inter-field latency of ⅟₆₀th of a second. As a consequence, there may be little or no correlation between adjacent fields in high motion sequences due to the fact that the image content of the image scene is rapidly evolving.

In NTSC Film (3:2), fields of the same frame are based on the same image scene and so are captured at the same moment in time. Thus, there is usually some, and possibly a considerable degree, of correlation between the odd and even fields that originate from the same frame of film. This is true for both in high and lows motion sequences, including sequences that are static. In relative terms, the fields of a 3:2 image sequence that do not originate from the same frame of film are likely to be less correlated in high motion sequences, but may continue to be highly correlated for a low motion sequence.

Figure 8:
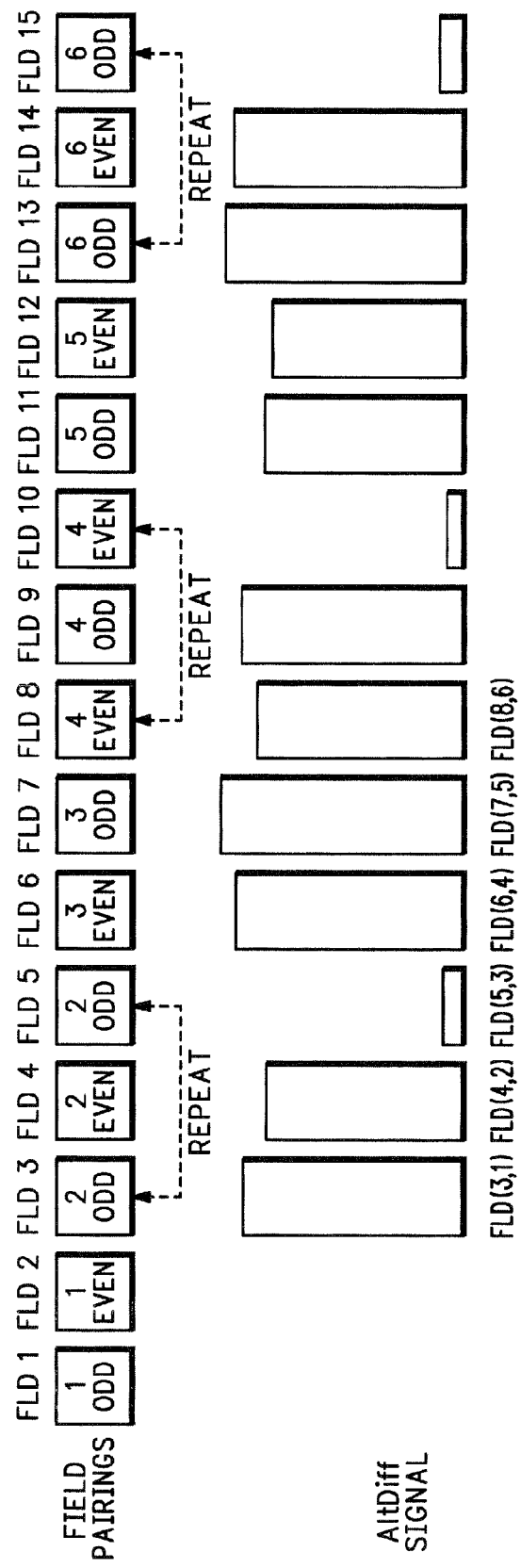
FIG. 8 is a schematic diagram illustrating typical alternating field comparisons for the 3:2 algorithm.

The AltDiff signal is generated using data from the Current Field and the Previous Previous Field. This signal is used to identify the repeated field characteristic of NTSC Film Mode. For a typical NTSC Film sequence, the signal generated by the AltDiff signal will have a 5-cycle pattern, consisting of 4 High signals and 1 Low signal. This pattern is the result of the repeated field that occurs every $5^{th}$ field, FIG. 8 illustrates the expected AltDiff signal pattern for NTSC Film (3:2).

Figure 9:
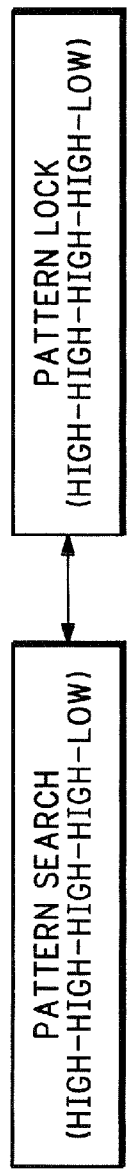
FIG. 9 is a schematic drawing of a state machine for detecting the pattern illustrated in FIG. 8.

A state machine, illustrated in FIG. 9, looks for the characteristic dip in the AltDiff signal. This dip is needed for the 3:2 State Machine to initialize 3:2 mode, Thereafter, the 3:2 State Machine attempts to track the incoming video signal for the 3:2 sequence.

Figure 10:
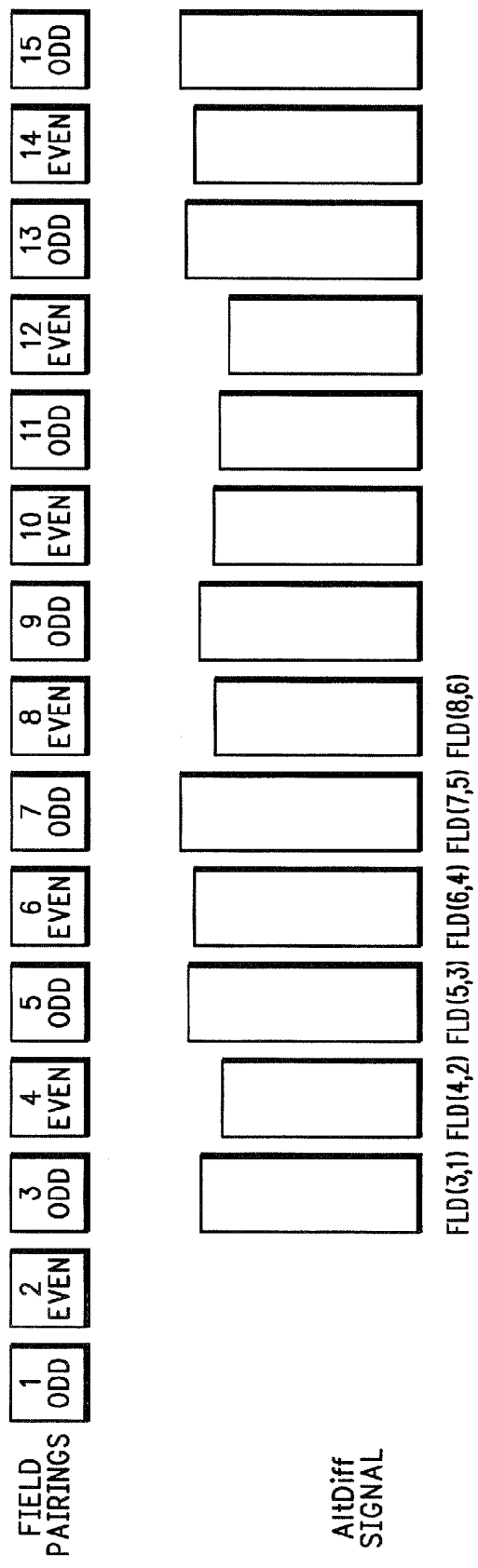
FIG. 10 is a schematic diagram illustrating alternating field comparisons for highly correlated fields for the 3:2 algorithm.

Some of the idiosyncratic behaviors of tracking 3:2 mode are engendered into the 3:2 State Machine. For instance, there is little or no correlation between every other field in NTSC Video mode with high motion. Thus the AltDiff signal will fluctuate but remain at a relatively high level. There will not be a large dip in the AltDiff sequence as would have been the case had the incoming video signal contained embedded NTSC film FIG. 10 illustrates the expected AltDiff signal pattern for NTSC Video.

The AdjDiff is generated using Current Field data and Previous Field data. The AdjDiff signal is used to identify the pattern that is a result of the repeated field characteristic found within NTSC Film (3:2) Mode. Odd and even fields originating from the same image scene will likely exhibit a significant degree of inter-field correlation. This will result in an expected low AdjDiff signal.

However, odd and even fields originating from different image scenes (i.e. different frames of film, had the video signal contained embedded film) may or may not be correlated, depending on whether the inter-field motion within the sequence is low or high. For a high motion sequence, the structured difference between the odd and the even fields will result in a high signal, or low correlation. For a low motion sequence, the signal will be low, or high correlation.

Figure 11:
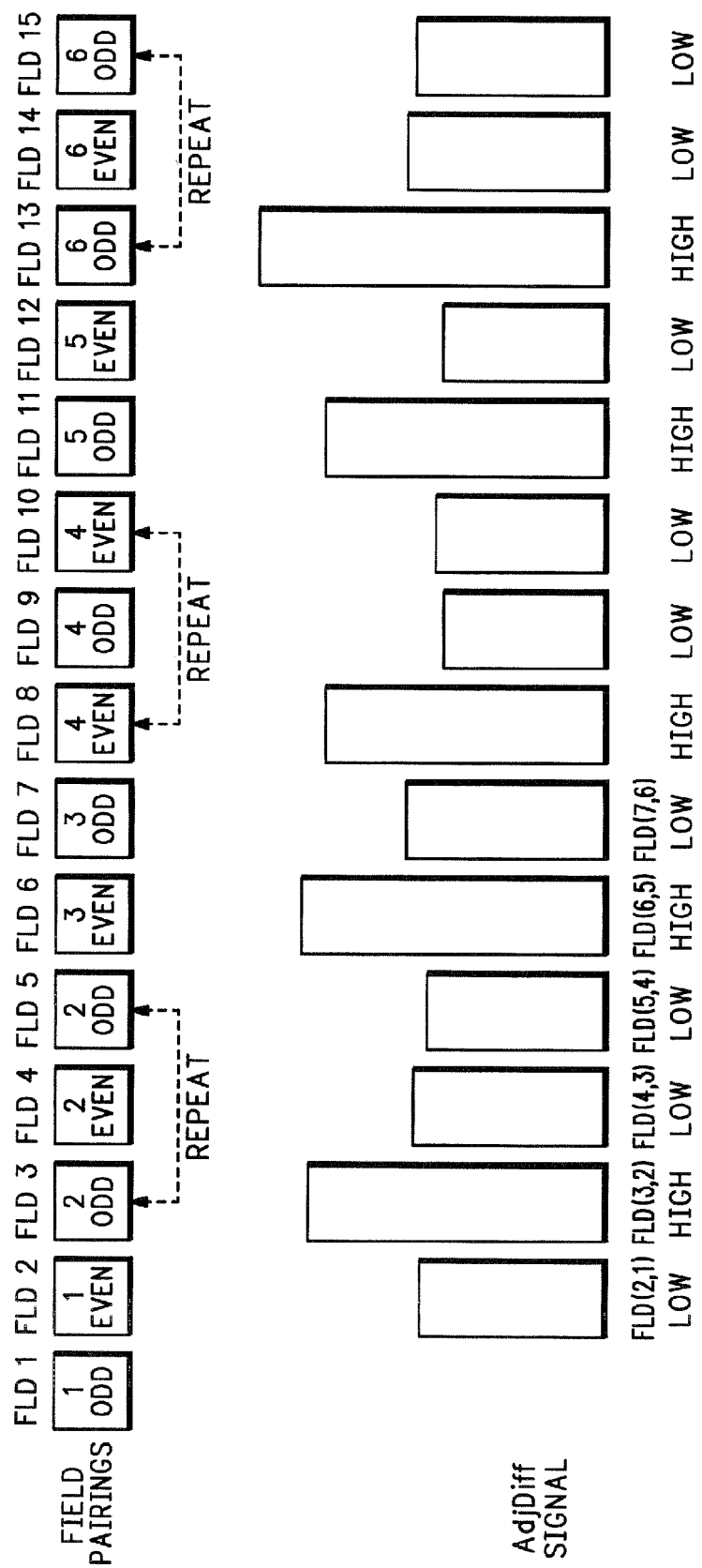
FIG. 11 is a schematic diagram illustrating typical adjacent field comparisons for the 3:2 algorithm.
Figure 12:
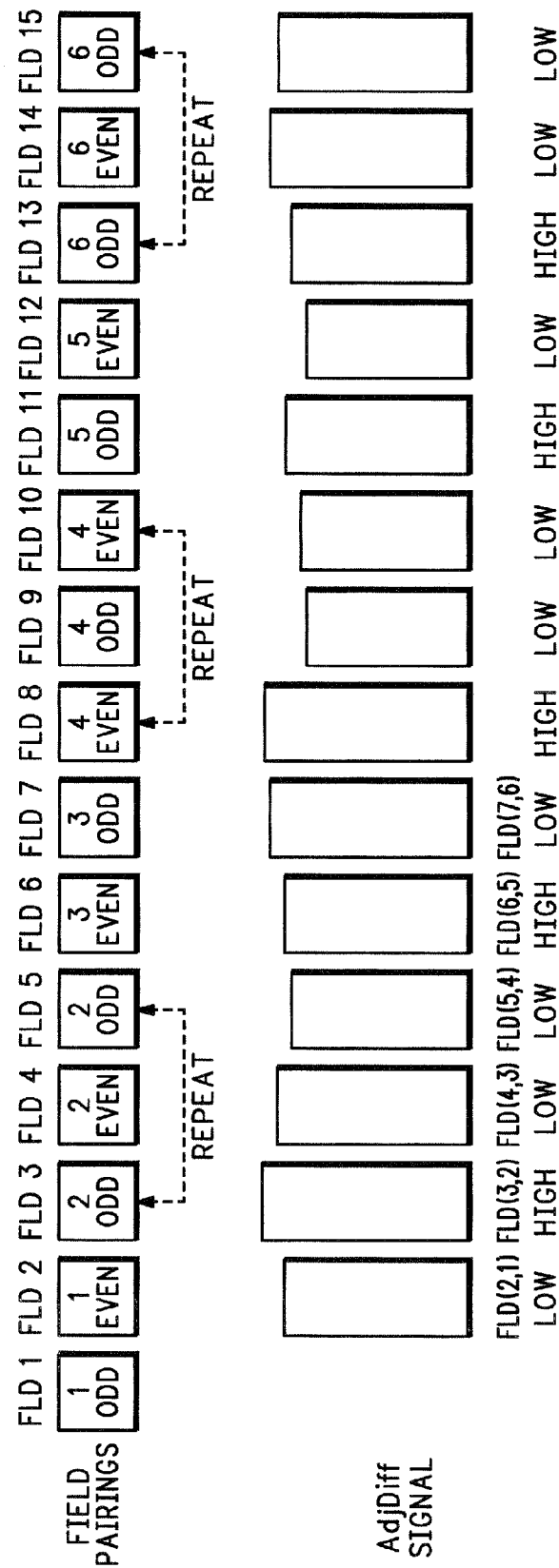
FIG. 12 is a schematic diagram illustrating adjacent field comparisons for highly correlated fields for the 3:2 algorithm.
Figure 13:
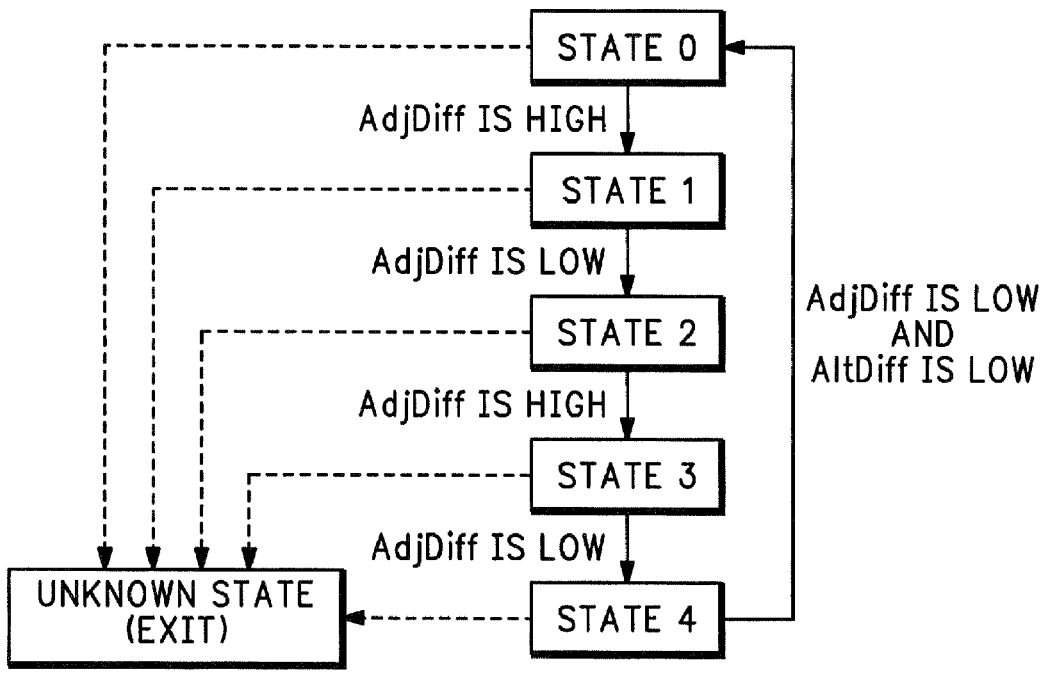
FIG. 13 is 3:2 state machine for analyzing adjacent field comparisons

In a high motion sequence, the AdjDiff signal maintains a 5-cycle pattern: High-Low-High-Low-Low as is illustrated in FIG. 11. For a low motion sequence, the AdjDiff signal may degrade to a relatively flat signal (having little variation) as illustrated in FIG. 12. FIG. 13 illustrates the basic 3:2 state machine for the AdjDiff signals.

Once the 3:2 state machine has concluded that the 3:2 pattern is present, it signals the arbiter state machine to that effect. Thereafter, barring contention brought about by the affirmation of another mode detected by another subordinate state machine, the 3:2 mode will predominate until such time as the 3:2 State Machine determines that the signal is no longer present. The 3:2 State Machine searches for the characteristic High-Low-High-Low-Low-High-Low-High-Low-Low-High- . . . pattern in the AdjDiff signal and the characteristic High-High-High-High-Low- . . . pattern in the AltDiff signal.

The 3:2 state machine is aware of the fact that a video sequence containing high motion can also become a video sequence in which the motion is low, and vice versa. Numerous conditions are weighed by the 3:2 state machine to help it transition through its internal states in an intelligent and robust manner to aid in continued detection of the 3:2 mode, These conditions include:

1. Normal Motion Conditions
2. Low Motion Conditions during the Same Scene
3. Low Motion Conditions during a Scene Change
4. Subtitles Detected (On Display/On Exit) and Same Scene
5. Subtitles Detected (On Display/On Exit) and Scene Change
6. One-time turn-over Conditions These are some of the states used by the 3:2 state machine. During each state, a specific pattern of the AltDiff and AdjDiff signals is expected. It is, nevertheless, quite possible that video sequences that contain low motion sequences or contain subtitles, or other data (such as special effects or the like) that may not satisfy hard conditions for continued tracking of the anticipated 3:2 pattern. It is undesirable to exit 3:2 mode prematurely due only to low motion sequence or the onset and continued presence of subtitles. Therefore, special conditions are in place within the 3:2 algorithm to watch for and guard against such eventualities.

For low motion scenarios, the isSaineScene signal can be used to help gauge whether the anticipated pattern is still effectively present. That is, if the scene is deemed not to have changed, a more relaxed threshold may be used to track the anticipated 3:2 pattern.

For subtitle entry and subtitle exit, the isSubtitle signal is used to indicate whether a subtitle was detected within the video signal. Therefore, if a subtitle is detected in the video sequence, then the rules for detecting a 3:2 pattern are relaxed. For example, a low AdjDiff signal is expected at a particular point within the sequence, but a High AdjDiff signal is present instead. If the isSubtitle signal is High, the 3:2 State Machine becomes more lenient, allowing for more departures from the strict interpretation of the 3:2 pattern. Therefore, the 3:2 State Machine makes allowances for one-time turnovers, which allow a single bad signal to occur without losing the 3:2 pattern.

The 2:2 State Machine

The 2:2 state machine is used to help determine whether to switch into 2:2 processing mode or whether to remain in (or switch back into) true video mode. The arbiter state machine makes the final decision. The 2:2 state machine snakes use of the AltDiff and AdjDiff signals, along with the isSameScene and isSubtitle information to move between various states.

The input data mode is determined by analyzing the pattern of the AltDiff and AdjDiff signals. In PAL Video, odd and even fields of an image scene are captured independently. Thus, there is likely to be little or no correlation between adjacent fields in high motion sequences.

In PAL Film (2:2), fields of the same frame of film are captured at the same moment in time. Thus, there is some correlation between odd and even fields coming from the same frame in both high and low motion sequences. Fields of 2:2 sequences that do not come from the same frame will have relatively less correlation in high motion sequences, but may continue to be highly correlated for a low motion sequence.

Figure 14:
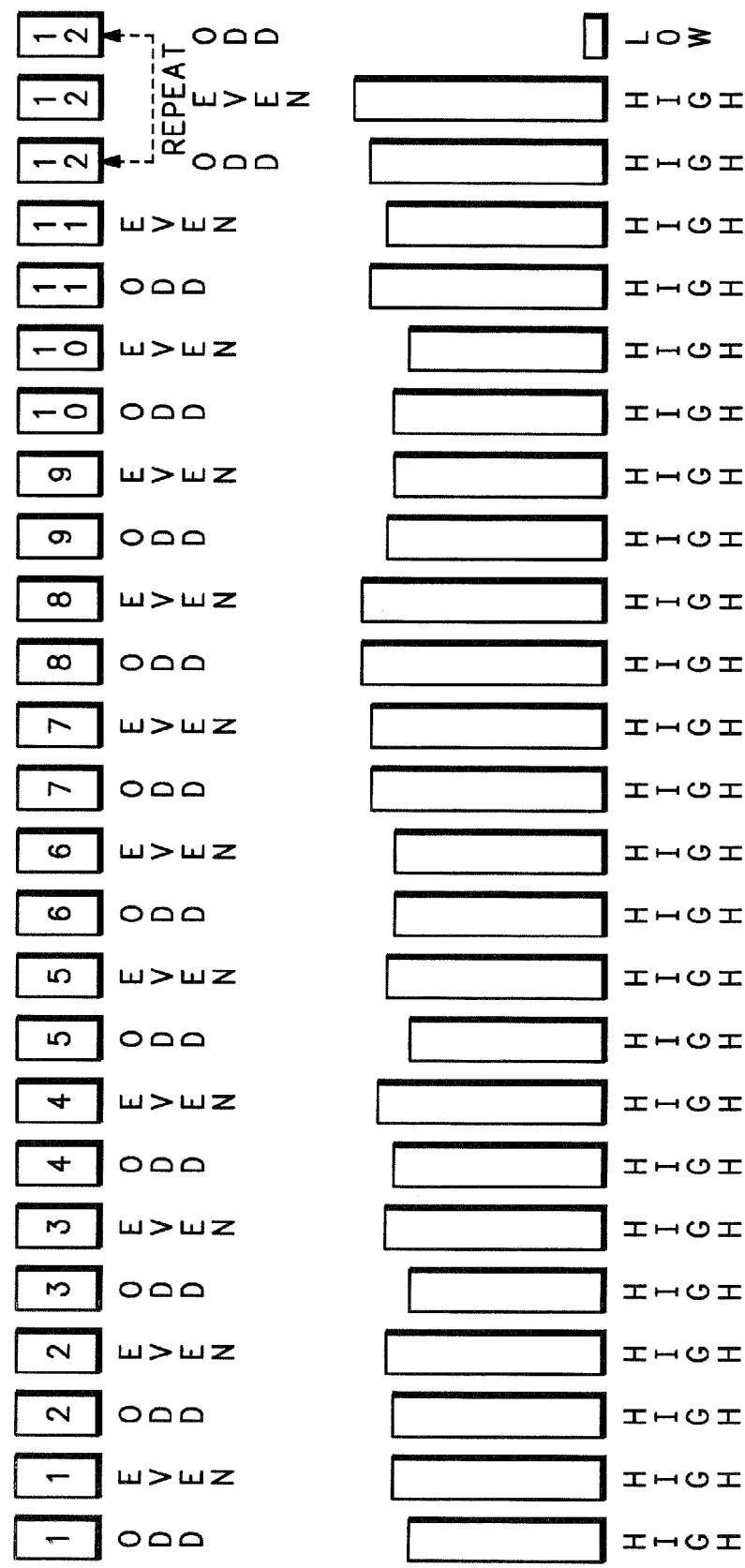
FIGS. 14–17 are schematic diagrams illustrating typical field comparisons for the 2:2 algorithm.

The AltDiff signal is generated using data from the Current Field and the Previous Previous Field. This signal is used to identify the repeated field characteristic of PAL (2:2) Telecine B Film Mode. For Telecine B 2:2 sequences, the signal generated by the AltDiff signal will have a 25-cycle pattern, consisting of 24 High signals and 1 Low signal. This pattern is the result of the repeated field that occurs every 25 cycles. FIG. 14 illustrates the expected AltDiff signal pattern for PAL (2:2) Telecine B Film. In Telecine A type PAL Film sequences, there is no useful pattern resulting from the AltDiff signal.

The AdjDiff signal is generated using data from the Current Field and the Previous Field. This signal is used to identify the pattern that is found within PAL Film (2:2) Mode. As stated earlier, odd and even fields originating from the same frame will be correlated, resulting in an expected low signal.

Odd and even fields originating from different image frames of film, may or may not be correlated, depending on whether the motion within the sequence is low or high. For a high motion sequence, the calculation between the odd and the even fields will result in a high signal, or low correlation. For a low motion sequence, the signal will be low, or high correlation.

Figure 15:
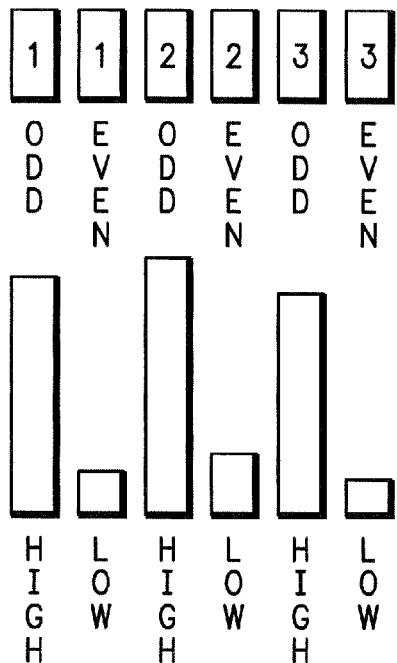
Figure 16:
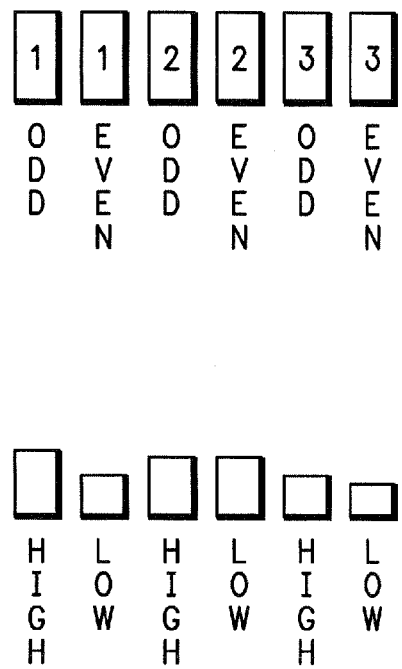

In a high motion sequence, the AdjDiff signal for Telecine A maintains a repetitive 2-cycle pattern: High-Low, as illustrated in FIG. 15 For a low motion sequence, the AdjDiff signal may degrade to a relatively "flat" signal, as illustrated in FIG. 16.

Figure 17:
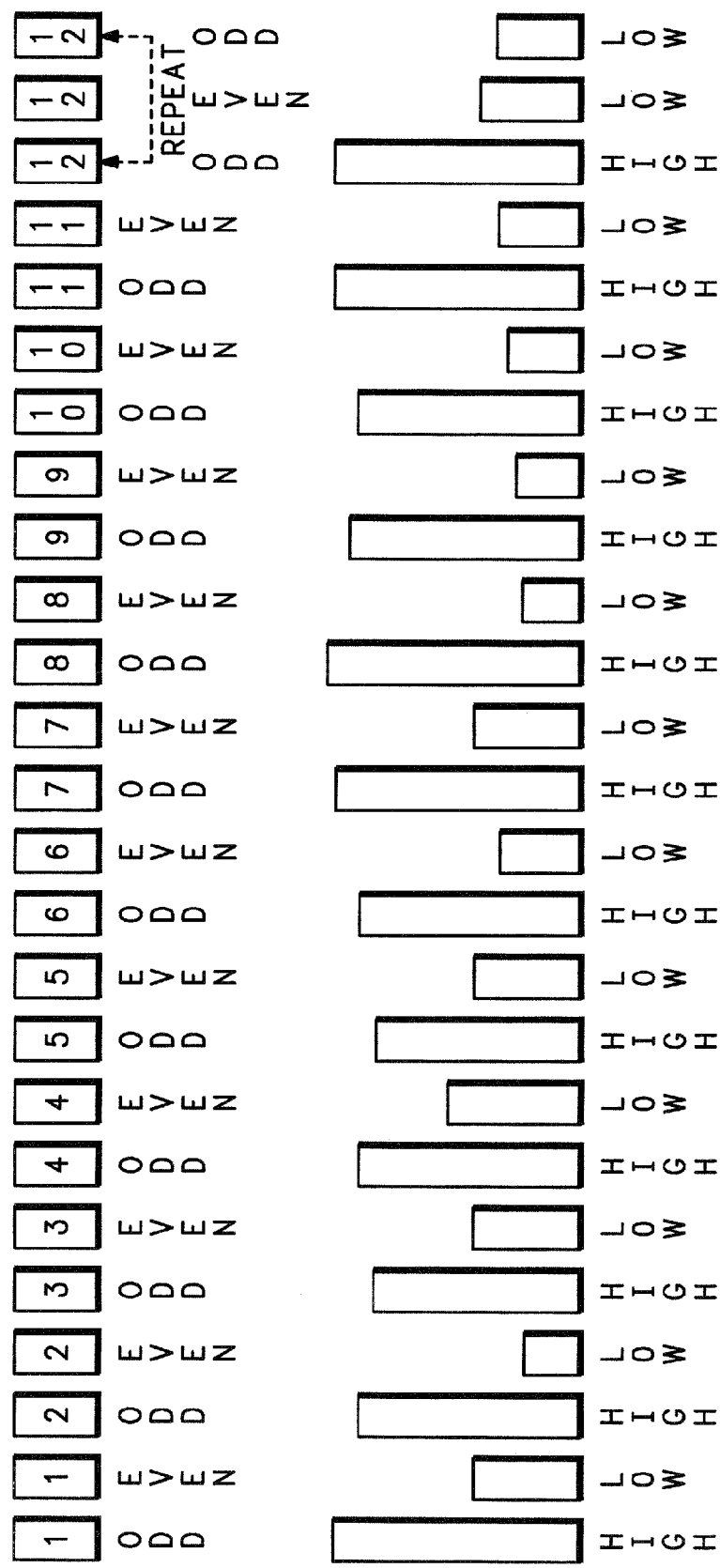

In a high motion sequence, the AdjDiff signal for Telecine B exhibits a 25-cycle pattern: High-Low-High-Low- . . . -High-Low-Low, as illustrated in FIG. 17. Similarly for Telecine B, the signal may degrade for Low Motion sequences.

Both the 3:2 state machines and 2:2 state machine use the AltDiff and the AdjDiff signals internally. However, these state machines can be separated into sub-components. One sub-component is responsible for detection of pertinent patterns in the AltDiff signal and a second sub-component is responsible for the detection of pertinent patterns in the AdjDiff signal.

The AltDiff signal is used for detecting Telecine B pattern. If a "dip" is found in the AltDiff signal, a counter is initialized and incremented on each successive field to track the 24 fields that must be observed prior to an anticipated dip in the AltDiff signal. The 2:2 state machine uses this information to track the low signal that is expected on every $25^{th}$ field.

Figure 18:
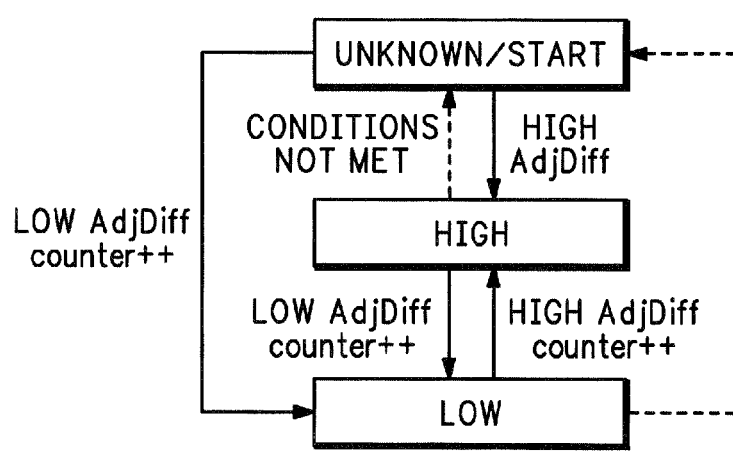
FIG. 18 is a schematic diagram of a state machine for a 2:2 Telecine A algorithm.

Referring to FIG. 18 the state machine for the 2:2 Telecine A Mode is illustrated. Telecine A usually requires several High-Low transitions prior to affirming that the input video signal exhibits the characteristic 2:2 pattern. A longer lead-time is required for 2:2 pattern detection because switching into 2:2 processing mode when the input video stream is not truly 2:2 can result in deinterlacing artifacts. Therefore, it is preferable that a high degree of certainty be attained that the underlying sequence is a 2:2 sequence prior to entering the 2:2 processing mode. Some of the conditions currently included in the algorithm are:

1. Normal Motion
2. Normal Motion, Same Scene
3. Low Motion, Same Scene
4. Subtitle Detected, Same Scene
5. Subtitle Detected, Scene Change
6. One-time Turnover
7. Low Cases-Telecine B only The following describes the workings of the 2.2 state machine. The methodology used in the 2:2 state machine is similar to that of the 3:2 state machine.

There are a number of internal states in the 2:2 state machine. Much like the 3:2 state machine, low motion sequences, subtitles, or other data (such as special effects, etc.) may not satisfy hard conditions that need to be met in order to deem that a 2:2 pattern is present. Therefore, as with the 3:2 state machine, the thresholds are relaxed if the isSameScene signal or the isSubtitle signal is asserted.

One departure from the 3:2 state machine is that the 2:2 state machine must detect and track two versions of the 2:2 pattern. These patterns are used internationally and are called Telecine A and Telecine B. Telecine A is the usually the easier of the two to detect. Telecine B is more complicated, and requires an additional counter and a separate state to detect reliably. The counter is used to measure the anticipated separation between "repeated fields". The "special" state in the 2:2 state machine detects the repeated field condition and expects a Low AltDiff signal. This algorithm is subject to all of the special conditions mentioned previously, such as low motion, subtitles, and the like.

The N:M State Machine

It should be noted that depending on a pulldown strategy used, the AltDiff and AdjDiff signals have different patterns. The pulldown strategy is one in which fields are drawn from an image scene. In 3:2 pulldown, 3 fields are drawn from the same image scene. For the next image scene only two fields are drawn. Hence the name 3:2 pulldown. In the general case, N fields can be drawn from one image scene and M fields can be drawn from the next image scene. Hence the term N:M pulldown.

There are some conditions that can be used to guide in the detection of the pulldown strategy. It is not always true that for all N:M pulldown strategies, that both AltDiff and AdjDiff will have periodic patterns. For example, if AltDiff is High for all time, then no more than two adjacent fields are drawn from the same image scene at a given time t. If AdjDiff is High for all time, then no more than one field is drawn from the same image scene at a given time t. Further, the image scene has changed when both AdjDiff and AltDiff are High. Based on these conditions, and the emergence of a pattern in either the AltDiff or AdjDiff signals, fields that were drawn from the same image scene are identified. Therefore, redundant field information is ignored and either the CF and PF are meshed or the PF and PPF are meshed in order to recover the image scene.

The N:M state machine searches for repetitive patterns in the input video signal to determine its modality. Once a pattern has been detected, this information can then be used to deinterlaced the fields of the incoming video signal in such a way the artifacts caused by interlacing are effectively removed.

The general idea behind the N:M state machine is to determine which fields need to be meshed together to recover the fields that originated from the same image scene and to ignore redundant fields. Once this is accomplished, subsequent operations such as scaling and noise reduction are performed on a fully sampled image. These operations will yield images that are visually superior in detail and sharpness compared to images operated on without performing the N:M detection.

The algorithm that is executed in the N:M Autonomous State Machine includes two Autocorrelation Engines and two Pattern Following State Machines. One Autocorrelation Engine (AE) examines the AltDiff signal and another examines the AdjDiff signal for patterns. Each AE performs the following mathematical operation for a given input signal v;

$$Corr(i) = \Sigma(v(j) \circledast v(j-i)) \text{ for all } j \text{ in } v,$$

The operator ⊛ that is most commonly used is multiplication, but other operations are also possible such as an exclusive NOR (XNOR). The XNOR is a logical operation that has a false (0) output when the inputs are different and a true (1) output when the inputs are the same.

The function Corr(i) will exhibit periodic behavior as the variable v(j) exhibits periodic behavior. Moreover, it is possible to discern the period of the signal v by examining the distance between two or more peak values in the Corr signal having equal amplitudes. In particular, if the XNOR correlation operator is used, the peak value should correspond exactly to the distance between peaks. Once two or more relevant peaks have been detected, a periodic N:M pattern has been found. The exact number of peaks required to define a pattern is governed by a programmable threshold. Once the pattern has been found in the v signal, the N:M Autonomous State Machine exacts the repeating portion of the v signal. This portion corresponds to the portion of the v signal that lies between peaks including the v signal value that is aligned with the peak.

That is, given that there are peaks at Corr(k) and Corr(k+d), the repeat portion of the v signal is given by the sequence (v(k+1),v(k+2), ..., v(k+d)) which is denoted as P. At this point pattern lock is achieved and the arbiter state machine is notified. The pattern P is then loaded into a Pattern Following State Machine. This state machine has the anticipated pattern on a field-by-field basis. It is initialized with the correct starting point, which is determined by the distance from the most recent relevant peak in Corr to the most recent field subsequent to this peak. The Pattern Following State Machine compares the incoming v signal to the anticipated signal P. As long as there is correspondence between these two signals a pattern lock is maintained.

If the pattern lock is lost due to a lack of agreement between the two signals, this information is communicated to the arbiter state machine. The arbiter state machine takes the necessary action. As described before, should subordinate state machines detect signals and simultaneously notify the arbiter state machine, the arbiter state machine uses conflict resolution rules and rules of precedence to determine a course of action, For instance, should the 3:2 state machine and the N:M state machine both indicate that a 3:2 pattern is present this serves to reinforce the belief that the 3:2 pattern is present, but priority could be given to the 3:2 state machine.

Subtitle State Machine

The subtitle state machine detects subtitles that have been inserted into the video signal at video rates. The subtitle state machine provides another input into the modality detection states machines. The operation of the subtitle state machine is described as follows.

Referring to FIG. 22, the word "TEXT" has been inserted to a video sequence as a subtitle. Initially the subtitle is not part of the image scene as indicated by its absence in the CF at time t-1. As the pixels are examined row by row in the CF, signals corresponding to both the spatial edge and the temporal edge are generated. The first set of signals for rows 1,2 and 3 show the Spatial Edge Information for the CF at time t-1.

Note that for convenience we also refer to the CF at time t-1 as the PF at time t. The corresponding signals are flat, indicating that no edges are present in those rows in the PF.

The subtitle first appears in the CF at time t. The corresponding spatial and temporal edge signals are generated. The spatial edge information (CF) shows how the spatial edge detector generates a signal based on the magnitude of the difference between spatially adjacent CF(i,j) and PF(i,j) pixels as we move across rows 1, 2 and 3. At the same time, a temporal edge detector generates a signal by examining the temporal edge. That is, a pixel-by-pixel magnitude of the difference CF(i,j)-PPF(i,j).

FIG. 23 illustrates the situation upon subtitle exit. The subtitle "TEXT" is present in the PF, but is not longer in the CF. The corresponding spatial edge signals and temporal edge signals are shown.

The spatial edge signal and the temporal edge signals are fed as inputs into the subtitle detector state machine. The state machine looks for successive pulses of sufficiently high frequency in the spatial edge signal and the temporal edge signal. If a succession of adjacent rows have a sufficient number of such transitions then the region is deemed to include a subtitle. This information is communicated to the 3:2, 2:2, N:M, and other state machines that require it as input. Many courses of action are possible upon determination of a subtitle, but one example would be to loosen the threshold requirements for 3.2 mode retention should 3:2 mode already have been detected.

Deinterlacing

The de-interlacing algorithm takes input from the state machines that detect and track the various video modes. If the state machines have detected that the source of the video sequence is film, then the appropriate redundant fields are ignored and the fields are meshed together. However, if it is determined that the source of the video sequence is video, then each field is de-interlaced in accordance with the appropriate technique being implemented by the de-interlacing algorithm. Such techniques include both public and proprietary techniques, as will be apparent to a person skilled in the art.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A system for detecting a non-video source embedded in a video sequence and providing direction to a deinterlacing algorithm accordingly, said system comprising:
   (a) a signal generator for generating first and second difference signals responsive to a decision window in the video sequence;
   (b) a plurality of pattern detection state machines, each for receiving said signals and for detecting a pattern in said video sequence in accordance with a user programmable threshold, wherein said pattern detecting state machine varies said programmable threshold in accordance with said first and second difference signals; and
   (c) an arbiter state machine coupled wit said plurality of pattern detection state machines for governing said pattern detection state machines and for determining whether or not a non-video source is embedded in said video sequence;
   where the first difference signal indicates relative spatial movement between a current field and a previous field; and
   where the second difference signal indicates a motion amount between adjacent fields.

2. A system as defined in claim 1, wherein if said arbiter state machine detects a non-video source said deinterlacing algorithm ignores redundant fields and deinterlaces said video source by meshing.

3. A system as defined in claim 2, wherein if said arbiter state machine does not detect a non-video source said deinterlacing algorithm deinterlaces said video source using a predetermined deinterlacing algorithm.

4. A system as defined in claim 1, wherein one of said plurality of pattern detection state machines is used for detecting a 3:2 pulldown pattern in the video sequence.

5. A system as defined in claim 1, wherein one of said plurality of pattern detection state machines is used for detecting a 2:2 pulldown pattern in the video sequence.

6. A system as defined in claim 1, wherein one of said plurality of pattern detection state machines is used for detecting a N:M pulldown pattern in the video sequence.

7. A system as defined in claim 1, wherein a plurality of said signals are motion signals for indicating a measure of motion in a field.

8. A system as defined in claim 7, wherein said motion signals are generated by:
   (a) calculating a difference between a first pixel in a first field and a second pixel in a second field, said second pixel having the same coordinates as said first pixel;
   (b) quantizing said difference against a series of programmable thresholds; and
   (c) determining how many of said quantized differences for each field exceeds a predetermined programmable threshold.

9. A system as defined in claim 8, wherein one of said motion signals is an alternate difference signal for representing motion between said first field and said second field, wherein said fields are sequential fields of the same polarity.

10. A system as defined in claim 8, wherein one of said motion signals is an adjacent difference signal for representing motion between said first field and said second field, wherein said fields are sequential fields of differing polarity.

11. A system as defined in claim 1, wherein one of said signals is a scene signal for indicating whether or not a scene change has occurred in the video sequence.

12. A system as defined in claim 1, wherein one of said signals is a static pattern signal for indicating a static pattern in a portion of said video sequence, said static pattern is a subtitle.

13. A system as defined in claim 12, wherein said subtitle is detected by examining a plurality of rows of pixels in a field of said video sequence and determining if a predetermined number of high-low transitions between pixels in a row occurs for a predetermined number of rows.

14. A system as defined in claim 13, wherein a first field is examined for detecting entry of said subtitle and a second field is examined for detecting departure of said subtitle.

15. A system as defined in claim 14, wherein said first field is a current field and said second field is a previous field.

16. A method for detecting a non-video source embedded in a video sequence and providing direction to a deinterlacing algorithm accordingly, said method comprising the steps of:
   (a) generating a first difference signal indicating movement between current and previous fields and a second difference signal indicating movement between adjacent fields responsive to a decision window in the video sequence;
   (b) detecting a pattern in said video sequence in accordance with a user programmable threshold;
   (c) varying said programmable threshold in accordance with said first and second difference signals; and
   (d) governing said pattern detection state machines for determining whether or not a non-video source is embedded in said video sequence.

17. A method as defined in claim 16, wherein said pattern is a 3:2 pulldown pattern in the video sequence.

18. A method as defined in claim 16, wherein said pattern is a 2:2 pulldown pattern in the video sequence.

19. A method as defined in claim 16, wherein said pattern is a N:M pulldown pattern in the video sequence.

20. A method as defined in claim 16, wherein a plurality of said signals are motion signals for indicating a measure of motion in a field.

21. A method as defined in claim 20, wherein said motion signals are generated by:
   (d) calculating a difference between a first pixel in a first field and a second pixel in a second field, said second pixel having the same coordinates as said first pixel;

(e) quantizing said difference against a series of programmable thresholds; and (f) determining how many of said quantized differences for each field exceeds a predetermined programmable threshold.

22. A method as defined in claim 21, wherein one of said motion signals is an alternate difference signal for representing motion between said first field and said second field, wherein said fields are sequential fields of the same polarity.

23. A method as defined in claim 21, wherein one of said motion signals is an adjacent difference signal for representing motion between said first field and said second field, wherein said fields are sequential fields of differing polarity.

24. A method as defined in claim 16, wherein one of said signals is a scene signal for indicating whether or not a scene change has occurred in the video sequence.

25. A method as defined in claim 16,
wherein one of said signals is a static pattern signal for indicating whether or not a static pattern is present in a portion of said video sequence;
wherein said static pattern is a subtitle.

26. A method as defined in claim 25, wherein said subtitle is detected by examining a plurality of rows of pixels in a field of said video sequence and determining if a predetermined number of high-low transitions between pixels in a row occurs for a predetermined number of rows.

27. A method as defined in claim 26, wherein a first field is examined for detecting entry of said subtitle and a second field is examined for detecting departure of said subtitle.

28. A method as defined in claim 27, wherein said first field is a current field and said second field is a previous field.

* * * * *

UNITED STATES PATENT AND TRADEMARK OFFICE
CERTIFICATE OF CORRECTION

PATENT NO. : 7,129,990 B2  Page 1 of 1
APPLICATION NO. : 10/024479
DATED : October 31, 2006
INVENTOR(S) : Finn Wredenhagen et al.

It is certified that error appears in the above-identified patent and that said Letters Patent is hereby corrected as shown below:

Column 19, line 38, the word "wit" should be replaced with --with--;
Column 20, line 59, the word "pulidown" should be replaced with --pulldown--.

Signed and Sealed this

Twenty Second Day of April, 2008

JON W. DUDAS
*Director of the United States Patent and Trademark Office*